(12) United States Patent
Princen et al.

(10) Patent No.: US 11,247,776 B2
(45) Date of Patent: Feb. 15, 2022

(54) AIRCRAFT HAVING EMBEDDED ENGINES

(71) Applicant: The Boeing Company, Chicago, IL (US)

(72) Inventors: Norman H. Princen, Long Beach, CA (US); Robert H. Liebeck, Irvine, CA (US); Edward L. Lawson, Long Beach, CA (US); Benjamin A. Harber, Irvine, CA (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 16/372,337

(22) Filed: Apr. 1, 2019

(65) Prior Publication Data

US 2020/0307789 A1   Oct. 1, 2020

(51) Int. Cl.
  B64C 39/10 (2006.01)
  B64D 27/14 (2006.01)
  (Continued)

(52) U.S. Cl.
  CPC .............. B64C 39/10 (2013.01); B64D 27/14 (2013.01); B64D 33/04 (2013.01);
  (Continued)

(58) Field of Classification Search
  CPC ... B64C 39/10; B64C 2039/105; B64C 15/02; B64D 27/14; B64D 33/04;
  (Continued)

(56) References Cited

U.S. PATENT DOCUMENTS 5,699,662 A * 12/1997 Born ...................... F02K 1/825
  60/39.5
5,893,535 A * 4/1999 Hawley ..................... B64C 3/00
  244/119

(Continued)

FOREIGN PATENT DOCUMENTS

| EP | 1818257 | 8/2007 |
|---|---|---|
| EP | 3048048 | 7/2016 |
| FR | 2938824 | 5/2010 |

OTHER PUBLICATIONS

EPO, European Search Report, Appl. No. EP20167366, dated Aug. 14, 2020.

(Continued)

*Primary Examiner* — Assres H Woldemaryam

(57) ABSTRACT

An aircraft having a blended-wing-body configuration includes a centerbody, a pair of wings, at least one pair of engines, a pair of air inlets, and a pair of exhaust outlets. The centerbody has an airfoil-shaped cross section, an aircraft centerline, an aft portion, an upper mold line, a lower mold line, and a pair of centerbody leading edge portions respectively on opposite sides of the aircraft centerline. The wings are integral with the centerbody. The pair of engines are located on opposite sides of the aircraft centerline and are mounted within the centerbody between the upper mold line and the lower mold line. The pair of air inlets are located respectively along the centerbody leading edge portions and are respectively fluidly coupled to the pair of engines. The pair of exhaust outlets our located in the aft portion of the centerbody and our respectively fluidly coupled to the pair of engines.

20 Claims, 20 Drawing Sheets

(51) Int. Cl.
  *B64D 33/04* (2006.01)
  *B64D 33/02* (2006.01)
(52) U.S. Cl.
  CPC .............................. *B64C 2039/105* (2013.01);
      *B64D 2033/0253* (2013.01); *B64D 2033/0286*
      (2013.01)
(58) Field of Classification Search
  CPC .... B64D 2033/0253; B64D 2033/0286; B64D
       33/06; B64D 33/02; B64D 27/26; B64D
       27/20; B64D 2027/262; Y02T 50/10
  See application file for complete search history.

(56) References Cited

U.S. PATENT DOCUMENTS

| | | | | |
|---|---|---|---|---|
| 5,909,858 | A * | 6/1999 | Hawley | B64C 39/10 244/36 |
| 6,923,403 | B1 * | 8/2005 | Dizdarevic | B64C 3/10 244/13 |
| 7,093,798 | B2 | 8/2006 | Whelan et al. | |
| 8,256,706 | B1 * | 9/2012 | Smith | B64D 33/02 244/53 B |
| 8,322,655 | B1 * | 12/2012 | Kismarton | B64C 5/02 244/119 |
| 8,366,050 | B2 | 2/2013 | Odie et al. | |
| 2002/0134886 | A1 * | 9/2002 | Seidel | F02C 7/04 244/53 B |
| 2003/0197097 | A1 * | 10/2003 | Wakayama | B64C 3/10 244/215 |
| 2003/0213870 | A1 * | 11/2003 | Eakins | B64C 1/0009 244/119 |
| 2004/0195454 | A1 | 10/2004 | Page et al. | |
| 2007/0023571 | A1 * | 2/2007 | Kawai | B64C 39/10 244/119 |
| 2008/0121756 | A1 * | 5/2008 | McComb | B64C 15/02 244/60 |
| 2010/0108802 | A1 * | 5/2010 | Marche | B64F 5/50 244/54 |
| 2011/0095136 | A1 * | 4/2011 | Schwarze | B64C 9/12 244/215 |
| 2014/0083518 | A1 * | 3/2014 | Whitmore | F02C 7/055 137/15.1 |
| 2016/0009402 | A1 * | 1/2016 | Hunter | B64C 39/02 244/53 R |
| 2016/0207630 | A1 * | 7/2016 | Moxon | B64D 27/14 |
| 2017/0183078 | A1 * | 6/2017 | Cazals | B64C 1/1461 |
| 2017/0197701 | A1 * | 7/2017 | Gielda | B64G 1/58 |
| 2018/0009525 | A1 * | 1/2018 | Keegan | H04K 3/20 |
| 2018/0362162 | A1 * | 12/2018 | Banerjee | B64C 1/0009 |

OTHER PUBLICATIONS

Wikipedia, "Boeing_X-48," retrieved on Feb. 6, 2019.
NASA, "Data Sheet on Blended Wing Body aircraft," retrieved on Dec. 21, 2018.
National Museum of the US Air Force, "Fact Sheet: Northrop_YB-49," retrieved on Mar. 28, 2019.

* cited by examiner

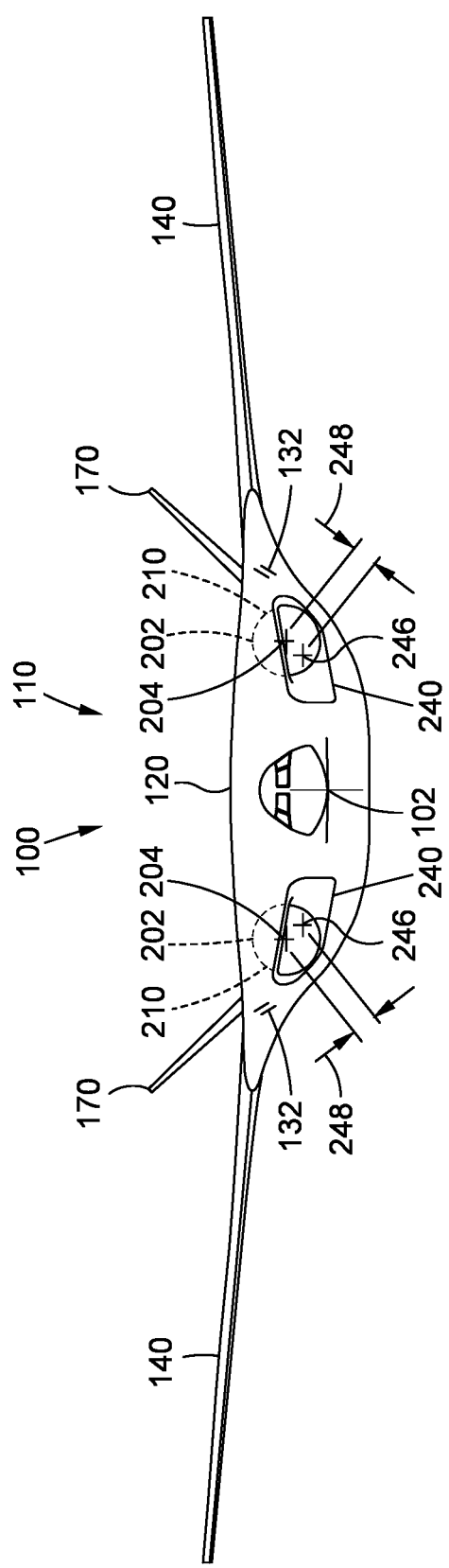
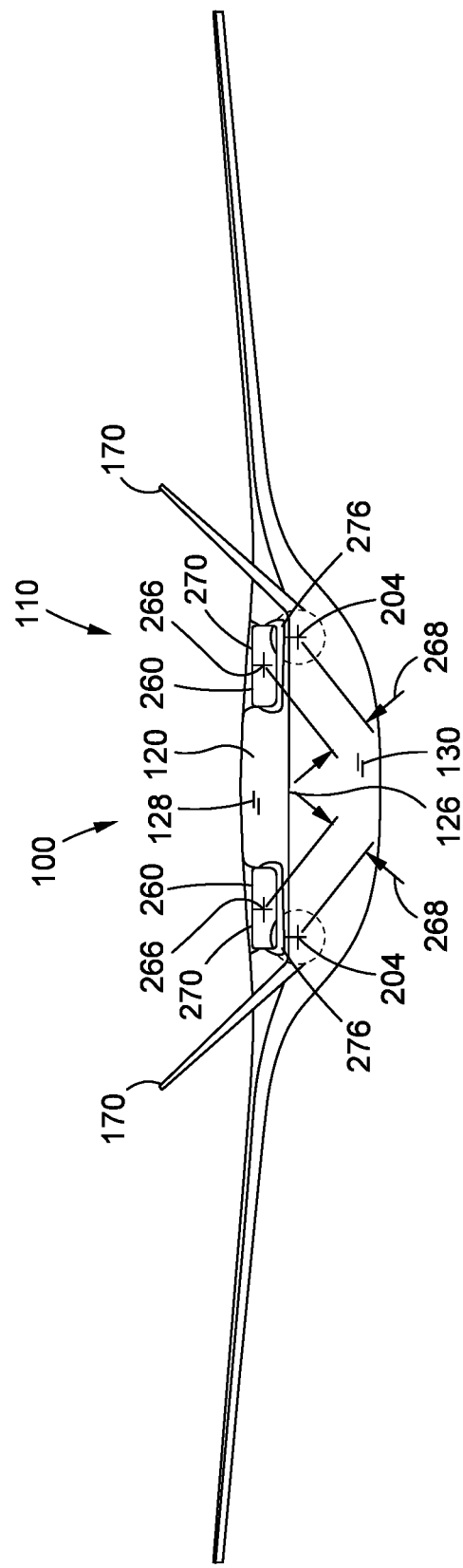

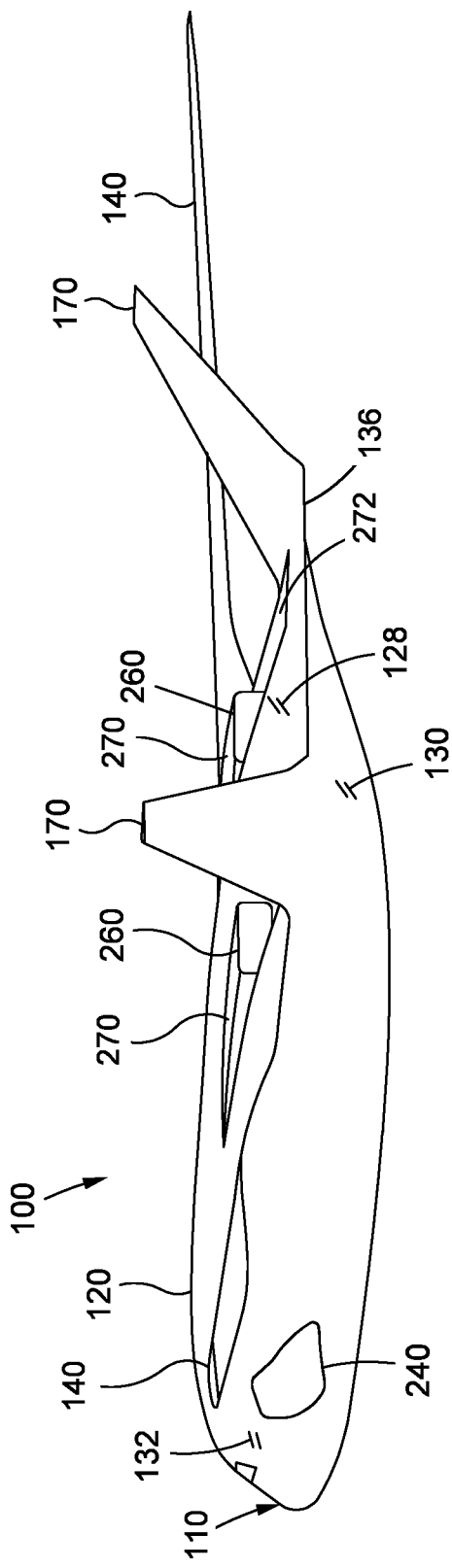

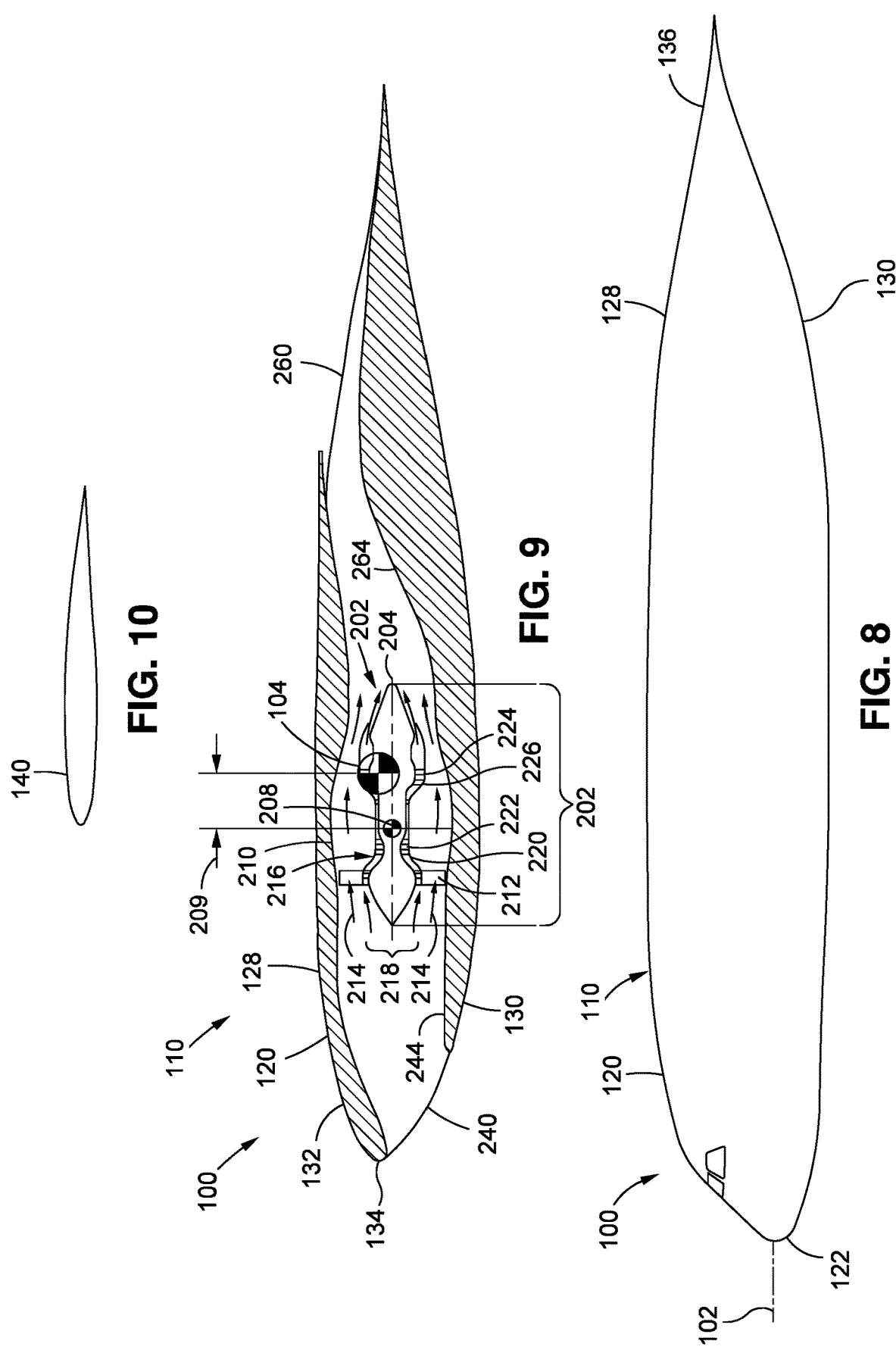

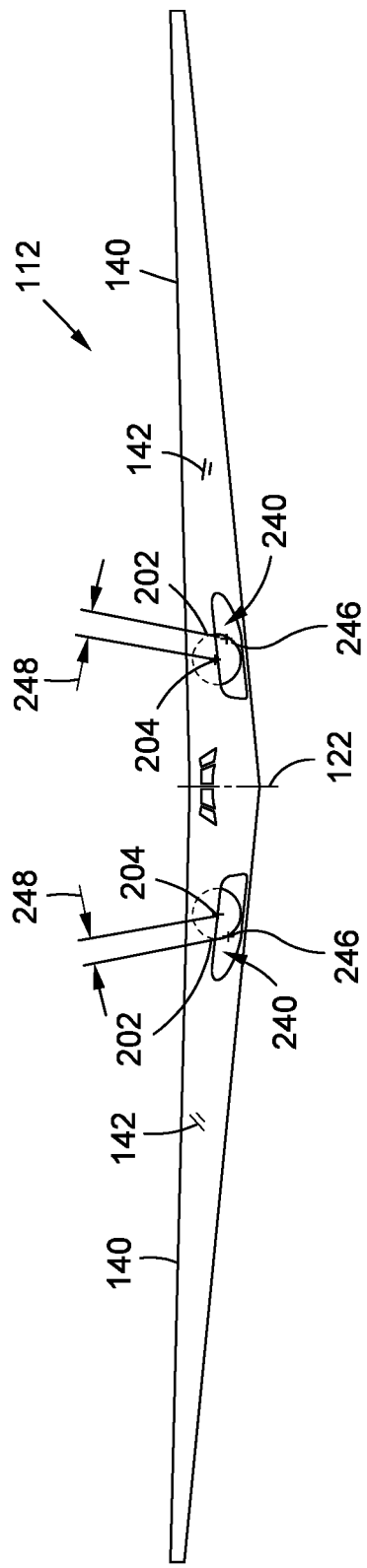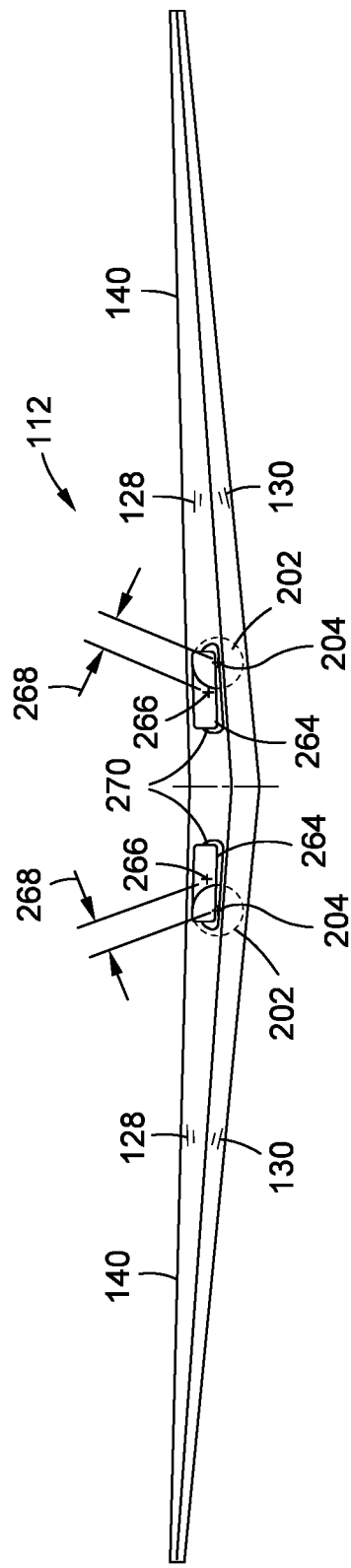

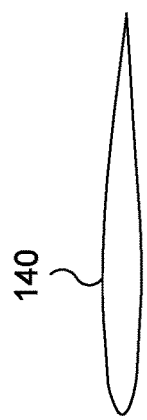
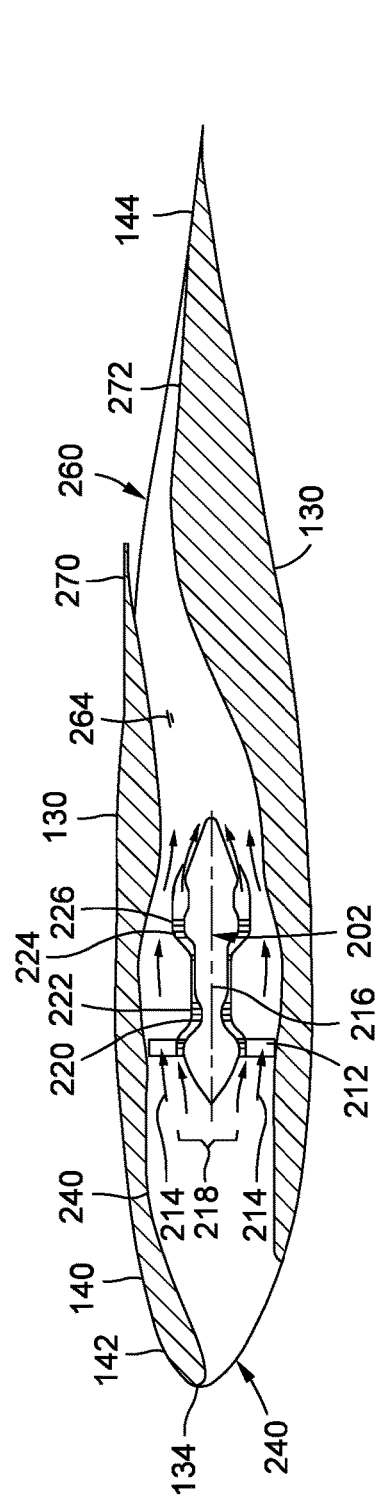
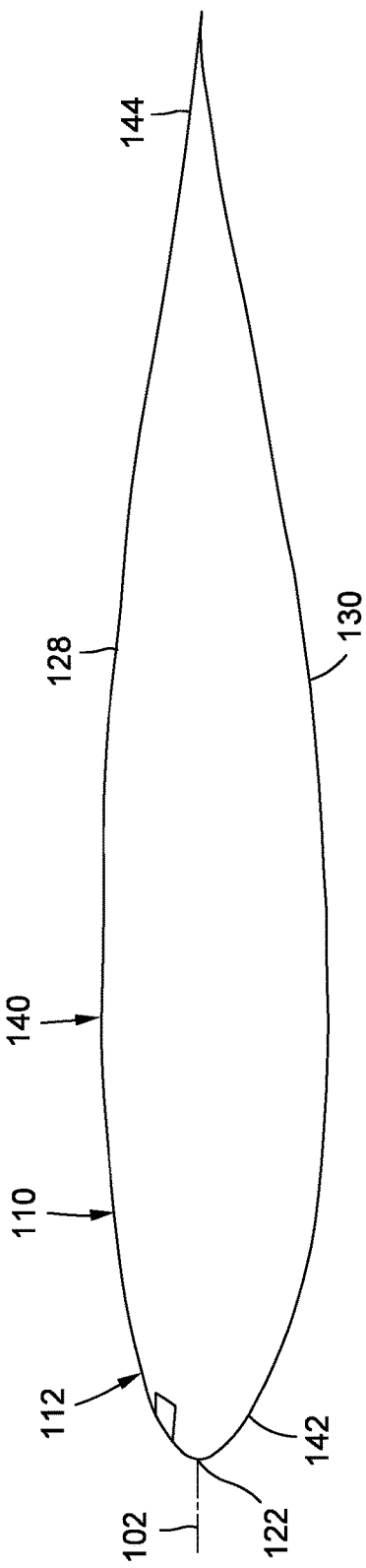
FIG. 30
FIG. 29
FIG. 28

AIRCRAFT HAVING EMBEDDED ENGINES

FIELD

The present disclosure relates generally to aircraft configurations and, more particularly, to aircraft having embedded engines.

BACKGROUND

Conventional aircraft configurations present several design challenges in terms of aerodynamics, cargo-carrying capability, and engine noise. For example, a tube-and-wing aircraft has a tubular fuselage that generates aerodynamic drag which detracts from the fuel efficiency of the aircraft. In addition, the relatively narrow shape of the fuselage limits the useable volume for carrying cargo and/or passengers. For aircraft having engines that are suspended from the wings or mounted on the aft end of the fuselage, the noise generated by the engines may prevent the aircraft from departing or arriving at airports during noise curfew hours.

As can be seen, there exists a need in the art for an aircraft configuration that addresses the above-noted challenges associated with the aerodynamics, engine noise, and cargo-carrying capabilities of existing aircraft configurations.

SUMMARY

The above-noted needs associated with conventional aircraft configurations are specifically addressed and alleviated by the present disclosure which provides an aircraft in a blended-wing-body configuration having embedded engines. In one example, the blended-wing-body configuration has a centerbody, a pair of wings, at least one pair of engines, a pair of air inlets, and a pair of exhaust outlets. The centerbody has an airfoil-shaped cross section, an aircraft centerline, an aft portion, an upper mold line, a lower mold line, and a pair of centerbody leading edge portions respectively on opposite sides of the aircraft centerline. The wings are integral with the centerbody. The pair of engines are located on opposite sides of the aircraft centerline and are mounted within the centerbody between the upper mold line and the lower mold line. The pair of air inlets are located respectively along the centerbody leading edge portions and are respectively fluidly coupled to the pair of engines. The pair of exhaust outlets are located in the aft portion of the centerbody and are respectively fluidly coupled to the pair of engines.

In addition, disclosed is a method of operating an aircraft. The method includes drawing air into a pair of air inlets located respectively along a pair of centerbody leading edge portions respectively on opposite sides of an aircraft centerline of the aircraft. The centerbody has an airfoil-shaped cross section. The aircraft has a pair of wings that are integral with the centerbody. The method includes passing the air from the air inlets into a pair of engines respectively located on opposite sides of the aircraft centerline. The engines are mounted within the centerbody between an upper mold line and a lower mold line of the centerbody. The method also includes combusting a fuel-air mixture within the pair of engines, and discharging an exhaust of the combustion of the fuel-air mixture from a pair of exhaust outlets respectively fluidly coupled to the pair of engines.

Also disclosed is an aircraft in a flying wing configuration having embedded engines. The flying wing configuration has a pair of wings integral with each other and collectively defining an aircraft centerline. Each one of the wings has an upper mold line, a lower mold line, a wing leading edge portion and a wing trailing edge portion. The aircraft includes at least one pair of engines located on opposite sides of the aircraft centerline and mounted respectively within the pair of wings between the upper mold line and the lower mold line. Each engine is configured as a turbofan engine. The aircraft also includes a pair of air inlets located respectively along the wing leading edge portions and respectively fluidly coupled to the pair of engines. In addition, the aircraft includes a pair of exhaust outlets respectively fluidly coupled to the pair of engines.

In addition, disclosed is a method of operating an aircraft having a flying wing configuration. The method includes drawing air into a pair of air inlets located respectively along a pair of wing leading edge portions respectively of a pair of wings on opposite sides of an aircraft centerline of the aircraft. The pair of wings are integral with each other. The method additionally includes passing the air from the air inlets into a pair of engines on opposite sides of the aircraft centerline and mounted respectively within the pair of wings between an upper mold line and a lower mold line. Each one of the pair of engines is configured as a turbofan engine. The method also includes combusting a fuel-air mixture within the pair of engines, and discharging an exhaust of combustion of the fuel-air mixture from a pair of exhaust outlets respectively fluidly coupled to the pair of engines.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is an aft-looking view of a forward end of the aircraft of FIG. 1 and illustrating the pair of air inlets being offset respectively from the engine centerlines of the pair of engines;

FIG. 4 is a forward-looking view of an aft end of the aircraft of FIG. 1 and illustrating the pair of exhaust outlets being offset respectively from the engine centerlines of the pair of engines;

FIG. 5 is a forward-looking perspective view of the aircraft of FIG. 1 illustrating the air inlets located below a leading edge forwardmost point of the centerbody leading edge portion;

FIG. 6 is a side view of the aircraft of FIG. 1 illustrating the exhaust outlets defined in an upper mold line of the centerbody;

FIG. 8 is a sectional view of the centerbody of the aircraft taken along line 8-8 of FIG. 7 and illustrating the cross-sectional shape of the centerbody at the aircraft centerline;

FIG. 9 is a sectional view of the aircraft taken along line 9-9 of FIG. 7 showing an engine mounted within the centerbody between an upper mold line and a lower mold line and further illustrating an inlet duct fluidly coupling an air inlet to the engine, and an exhaust duct fluidly coupling the engine to an exhaust outlet;

FIG. 10 is a sectional view of the aircraft taken along line 10-10 of FIG. 7 and illustrating a cross-section of a wing;

FIG. 25 is an aft-looking end view of the aircraft of FIGS. 23-24 and illustrating each air inlet being offset from the engine centerline;

FIG. 26 is a forward-looking end view of the aircraft of FIGS. 23-24 and illustrating each exhaust outlet being offset from the engine centerline;

FIG. 28 is a sectional view of the aircraft taken along line 28-28 of FIG. 27 and illustrating the airfoil-shaped cross-section at the aircraft centerline;

FIG. 29 is a sectional view of the aircraft taken along line 29-29 of FIG. 27 showing an engine mounted between the upper mold line and the lower mold line of the wing and further illustrating the inlet duct fluidly coupling the air inlet to the engine, and the exhaust duct fluidly coupling the engine to the exhaust outlet;

FIG. 30 is a sectional view of the aircraft taken along line 30-30 of FIG. 27 and illustrating a cross-section of a wing;

DETAILED DESCRIPTION

Figure 1:
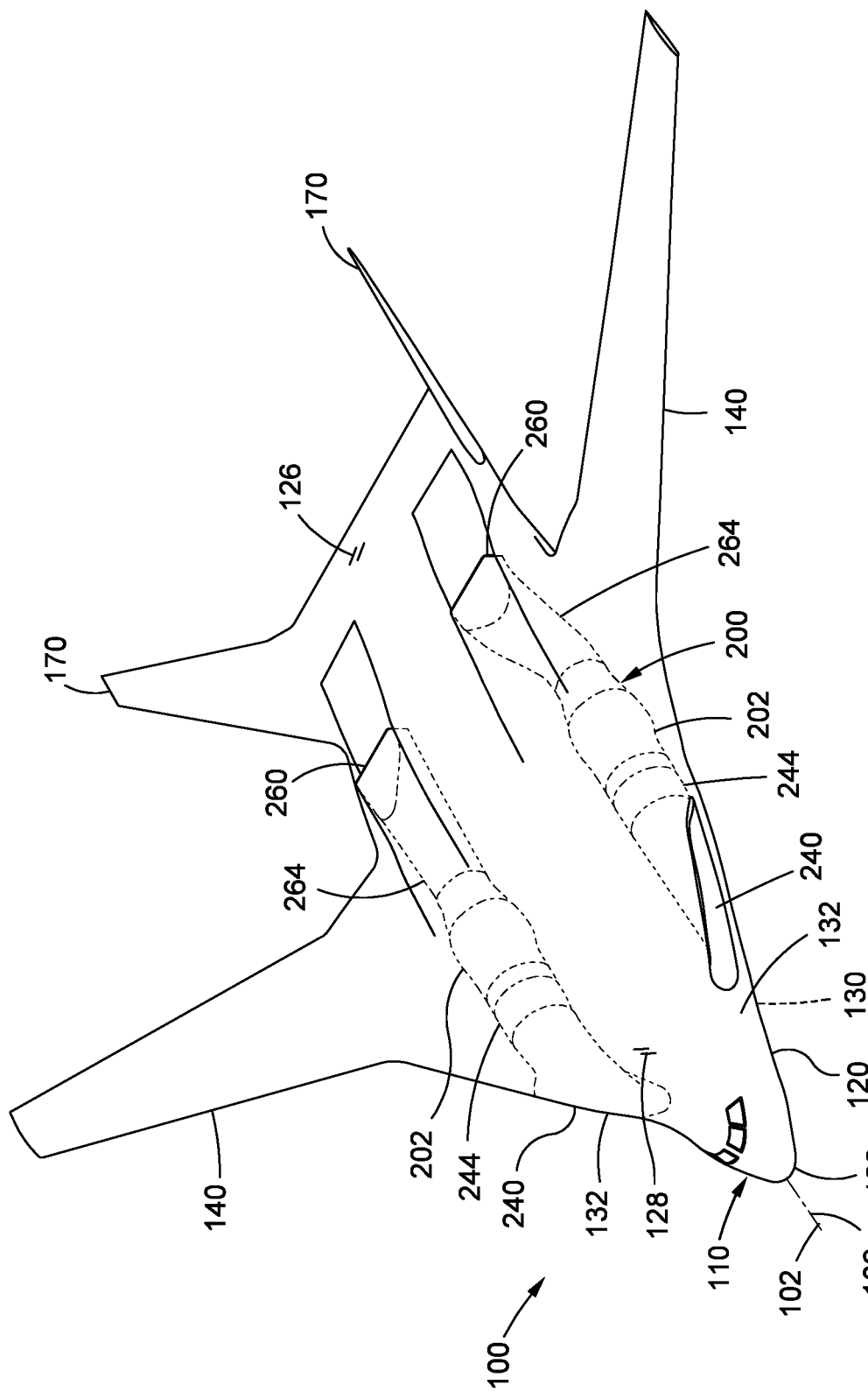
FIG. 1 is a top-down aft perspective view of an example of an aircraft configured as a flying wing platform and having a blended-wing-body configuration in which a pair of engines are embedded within a centerbody of the aircraft and illustrating a pair of air inlets respectively located along the centerbody leading edge portions.
Figure 2:
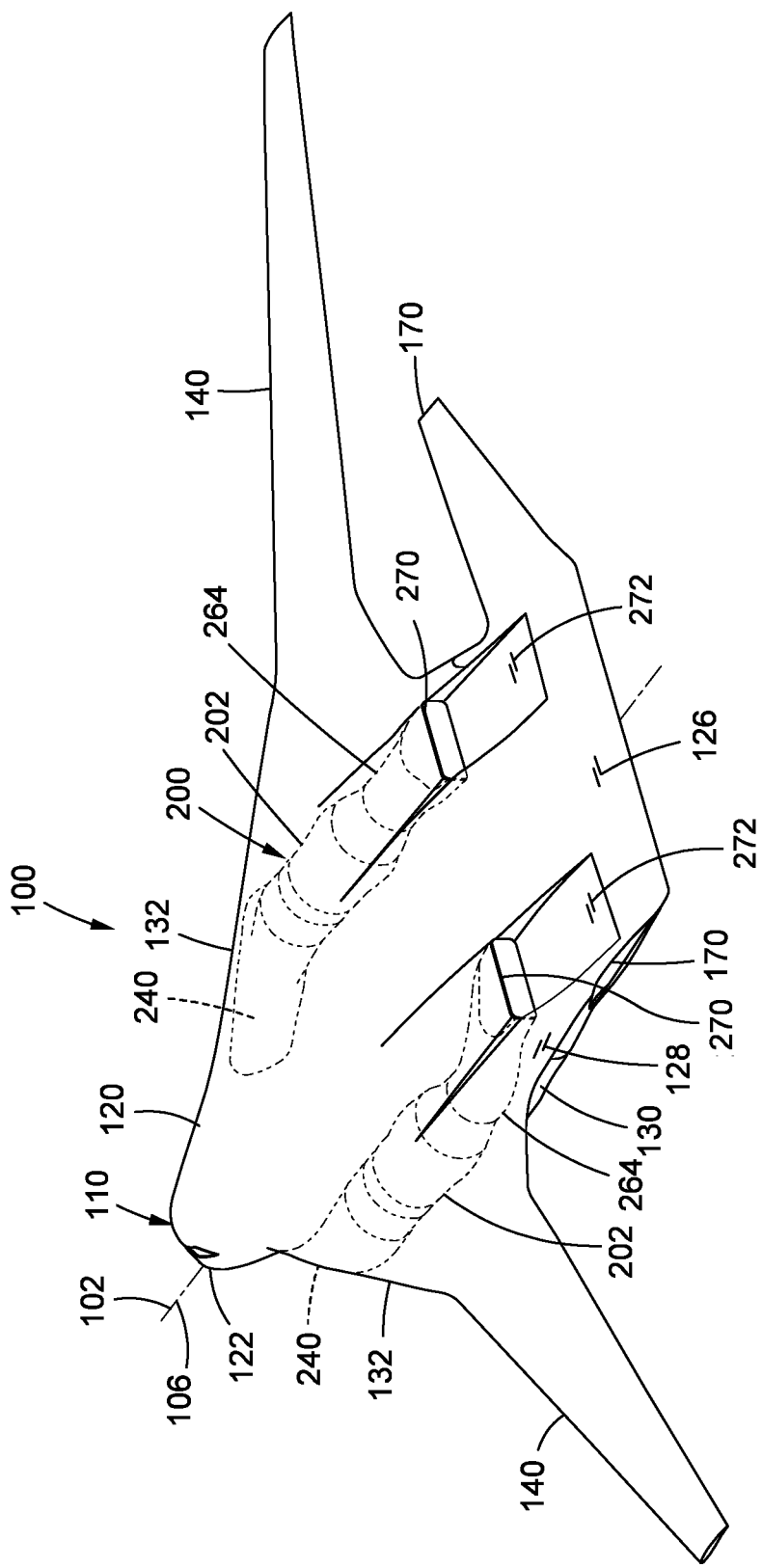
FIG. 2 is a top-down forward perspective view of the aircraft of FIG. 1 and illustrating a pair of exhaust outlets located in an aft portion of the centerbody.

Referring now to the drawings which illustrate various examples of the disclosure, shown are examples of aircraft 100 configured as flying wing platforms having embedded engines 202. FIGS. 1-21 show an example of an aircraft 100 in a blended-wing-body configuration 110 having embedded engines 202. FIGS. 1-2 show perspective views of the blended-wing-body configuration 110. The aircraft 100 includes a centerbody 120 which has an airfoil-shaped cross section. In addition, the aircraft 100 includes a pair of wings 140 that are separated from each other by the centerbody 120. The blended-wing-body configuration 110 may be distinguished from a conventional tube-and-wing aircraft (not shown) in that each of the wings 140 of the blended-wing-body configuration 110 are integral with the centerbody 120 and smoothly blend into the centerbody 120. The centerbody 120 extends from a nose 122 to an aft portion 126 of the centerbody 120. The aircraft 100 may be constructed of metallic material (e.g., aluminum, titanium, etc.) and/or non-metallic material (e.g., fiber-reinforced polymer matrix material such as carbon-fiber composite material). The aircraft 100 has an aircraft centerline 102 which, in the present disclosure, is the longitudinal axis 106 of the aircraft 100. In addition, the aircraft 100 has an upper mold line 128, a lower mold line 130, and a pair of centerbody leading edge portions 132 respectively on opposite sides of the aircraft centerline 102. In the present disclosure, the upper mold line 128 of the centerbody 120 may be described as the outer mold line on the upper side of the centerbody 120, and the lower mold line 130 of the centerbody 120 may be described as the outer mold line on the lower side of the centerbody 120.

In FIGS. 1-2, the aircraft 100 includes a propulsion system 200 having at least one pair of engines 202 located on opposite sides of the aircraft centerline 102. Notably, the engines 202 are mounted within the centerbody 120 between the upper mold line 128 and the lower mold line 130. In this regard, the engines 202 are embedded within the centerbody 120 of the aircraft 100 as shown in FIG. 9 and described in greater detail below. The centerbody 120 includes a pair of air inlets 240 located respectively along the pair of centerbody leading edge portions 132 which may be described as the forward region of the airfoil of the centerbody 120. For example, as described below, the air inlets 240 may be located below the leading edge forwardmost point 134 (FIG. 9) of the centerbody leading edge portions 132, or the air inlets 240 may be located above the leading edge forwardmost point 134 of the centerbody leading edge portions 132, depending upon the aircraft aerodynamics and other considerations. For example, the air inlets 240 may be located below the leading edge forwardmost point 134 which may result in better aerodynamics for the air inlet 240 but which may allow more noise from the engine fan(s) 212 (FIG. 9) to radiate to the ground below. Alternatively, the air inlets 240 may be located above the leading edge forwardmost point 134 which may result in less noise from the engine fan(s) 212 radiating to the ground but presenting greater challenges for the aerodynamics of the air inlets 240. The pair of air inlets 240 are respectively fluidly coupled to the pair of engines 202. For example, the centerbody 120 may include a pair of inlet ducts 244 respectively fluidly coupling the pair of air inlets 240 to the pair of engines 202. The centerbody 120 also includes a pair of exhaust outlets 260 located in the aft portion 126 of the centerbody 120. The pair of exhaust outlets 260 are respectively fluidly coupled to the pair of engines 202. For example, the centerbody 120 may include a pair of exhaust ducts 264 respectively fluidly coupling the pair of exhaust outlets 260 to the pair of engines 202.

The upper mold line 128 and the lower mold line 130 define the aerodynamic contour of the centerbody 120. The size and shape of the centerbody 120 may be such that the engines 202 are embedded within the centerbody 120 in a manner that avoids the need for locally-placed drag-reducing blisters or fairings (not shown) otherwise required for covering components or portions of the engines 202 that would protrude above the aerodynamic contour. In some examples of the presently-disclosed aircraft 100, the airfoil-shaped cross section of the centerbody 120 may be a shape that generates lift. For example, the airfoil-shaped cross section of the centerbody 120 may generate lift during forward motion of the aircraft 100 by causing the oncoming airflow to pass over the upper mold line 128 of the centerbody 120 at a higher speed than the speed at which the oncoming airflow passes over the lower mold line 130 of the centerbody 120. The difference in the speed of the airflow may be due to a relatively higher degree of curvature of the upper mold line 128 of at least a portion of centerbody 120 than the degree of curvature of the lower mold line 130 of the same portion of the centerbody 120. The higher degree of curvature of the upper mold line 128 may result in an area of relatively low air pressure above the centerbody 120 and relatively high air pressure below the centerbody 120. The difference in air pressure above and below the centerbody 120 may result in a net upward lifting force generated by the centerbody 120. The combination of the net upward lifting force generated by the centerbody 120 and lift generated by the wings 140 may support the weight of the aircraft 100 during level flight.

By embedding the engines 202 within the centerbody 120 instead of mounting the engines 202 on the aircraft exterior (e.g., on pylons—not shown) where the engines 202 would protrude into the airstream, the aircraft 100 may reduce or eliminate the negative impact that externally-mounted engines (not shown) would have on the aerodynamics of the aircraft 100. For example, embedding the engines 202 within the centerbody 120 may reduce or eliminate aerodynamic drag otherwise generated by externally-mounted engines. The reduction in aerodynamic drag may result in improved fuel efficiency. For example, the fuel efficiency of a blended-wing-body configuration 110 aircraft 100 with embedded engines 202 may be up to 30 percent less than the fuel efficiency of a similarly sized tube-and-wing aircraft.

Referring to FIG. 3, shown is an aft-looking view of the blended-wing-body configuration 110 aircraft 100 showing the wings 140 on each side of the aircraft 100 smoothly blended into the centerbody 120. In the example aircraft 100 shown, the wings 140 extend upwardly from the centerbody 120 at a dihedral angle relative to horizontal. However, in an example not shown, the aircraft 100 may include wings 140 that have no dihedral. In an alternative example not shown, the wings 140 may extend downwardly from the centerbody 120 at an anhedral angle relative to horizontal.

Also shown in FIG. 3 are a pair of vertical stabilizers 170 extending upwardly from the aft portion 126 and located on opposite sides of the aircraft centerline 102. Each one of the vertical stabilizers 170 may be located at a position that avoids the afterwardly-directed exhaust stream (not shown) exiting the exhaust outlets 260 from directly impinging on the vertical stabilizers 170. In the example shown, each one of the vertical stabilizers 170 is canted at a non-vertical orientation which may advantageously provide improved controllability of the aircraft 100 relative to stabilizers (not shown) that are vertically oriented. For example, vertical stabilizers 170 that are canted may be configured to provide or assist in pitch control and/or yaw control of the aircraft 100.

In FIG. 3, the centerbody 120 may have a generally flat or slightly curved upper surface when the aircraft 100 is viewed along an aft-looking direction. The lower surface of the centerbody 120 may be generally flat or slightly curved in the center portion of the aircraft 100 near the aircraft centerline 102. On each side of the aircraft 100, the lower surface of the centerbody 120 may curve upwardly towards the lower side of the corresponding wing 140 and smoothly blend into the lower surface of the wing 140. At least a portion of the centerbody 120 may have a width that is larger than the overall height or thickness of the centerbody 120. The centerbody 120 may have a width that accommodates a payload bay 124 (FIG. 7) in addition to accommodating the inlet ducts 244 (FIGS. 1-2), the engines 202, and the exhaust ducts 264 (FIGS. 1-2).

Also shown in FIG. 3 is the pair of air inlets 240 located respectively along the pair of centerbody leading edge portions 132 on opposite sides of the aircraft 100. As mentioned above, the pair of air inlets 240 are fluidly coupled respectively to the pair of engines 202. When the aircraft 100 is viewed along a forward-aft direction (e.g., parallel to the aircraft centerline 102), each one of the air inlets 240 may be generally aligned with the engine 202 to which the air inlet 240 is fluidly coupled. For example, when the aircraft 100 is viewed along an aft-looking direction parallel to the aircraft centerline 102, the cross-sectional area of each air inlet 240 may at least partially overlap the cross-sectional area bounded by the engine duct 210 (FIG. 6) enclosing the engine 202. The alignment of each air inlet 240 with the corresponding engine 202 may facilitate airflow into the engine 202.

In FIG. 3, each air inlet 240 may be described as having an inlet geometric center 246 which may be generally defined as the area centroid of an area bounded by a perimeter of the air inlet 240 at the outer mold line of the centerbody leading edge portion 132 when the air inlet 240 is viewed from a location forward of the aircraft 100 looking aft along a direction parallel to the aircraft centerline 102. In some examples not shown, each air inlet 240 may be located on the corresponding centerbody leading edge portion 132 such that the engine centerline 204 of the corresponding engine 202 extends through the inlet geometric center 246. In the example shown in FIG. 7, the engine centerline 204 of each engine 202 may be generally aligned with the aircraft centerline 102 when the aircraft 100 is viewed from the top-down direction. However, in any one of the aircraft examples disclosed herein, the engine centerline 204 of each engine 202 may be canted or tilted relative to the aircraft centerline 102 and which may provide advantages for the flow path from the air inlets 240 to the engines 202, and/or advantages for the flow path from the engines 202 to the exhaust outlets 260.

In FIG. 3, each air inlet 240 may be located on the corresponding centerbody leading edge portion 132 such that the inlet geometric center 246 of the air inlet 240 is offset by an air inlet offset 248 distance from the engine centerline 204 of the corresponding engine 202. For example, the inlet geometric center 246 of each air inlet 240 may be located inboard of and below the engine centerline 204 of the corresponding engine 202. The above-noted location of the inlet geometric center 246 of each air inlet 240 may be the result of the air inlet 240 being located below the leading edge forwardmost point 134 (e.g., see FIG. 9) on the centerbody leading edge portion 132 as a means to reduce or avoid disruptions to the incoming airflow that may otherwise occur at high angles of attack if the majority of each air inlet 240 were located above the leading edge forwardmost point 134 on the centerbody leading edge portion 132, as mentioned above and described below. In the present disclosure, the inboard direction may be described as a horizontal direction toward the aircraft centerline 102 when the aircraft 100 is viewed along a top-down direction. The outboard direction may be described as a horizontal direction away from the aircraft centerline 102 when the aircraft 100 is viewed along a top-down direction.

Referring still to FIG. 3, each air inlet 240 may have a non-circular inlet shape when the air inlet 240 is viewed along a direction parallel to the aircraft centerline 102. For example, each air inlet 240 may have a generally rectangular or trapezoidal shape with rounded corners. FIG. 3 illustrates each one of the air inlets 240 having an inlet width that is greater than an inlet height. However, in an example not shown, each air inlet 240 may have a generally circular or oval shape that may be complementary to a generally circular shape of the engine duct 210 which may enclose the engine 202. Each air inlet 240 may be configured in any one of a variety of shapes other than the above-mentioned rectangular, trapezoidal, oval, or circular shapes.

Referring to FIG. 4, shown is a forward-looking view of an aft end of the blended-wing-body configuration 110 aircraft 100 illustrating the pair of exhaust outlets 260. In the example shown, the pair of exhaust outlets 260 are defined in the upper mold line 128 (e.g., the upper side) of the aft portion 126 of the centerbody 120. Each exhaust outlet 260 may be defined in part by an exhaust duct cowling 270 that may protrude above the upper mold line 128 of the centerbody 120. In addition, each exhaust outlet 260 may be defined in part by an exhaust duct ramp 272 (FIG. 2) that may extend afterwardly from each one of the exhaust outlets 260. Each exhaust duct ramp 272 may be a depression in the upper mold line 128 at the aft end of the exhaust duct cowling 270. The aft end of each exhaust duct ramp 272 may smoothly blend into the upper mold line 128 of the aft portion 126 of the centerbody 120.

In FIG. 4, each exhaust outlet 260 has an outlet geometric center 266. Similar to the above-described inlet geometric center 246 (FIG. 3) of each air inlet 240 (FIG. 3), the outlet geometric center 266 may be generally defined as the area centroid of an area bounded by a perimeter of the exhaust outlet 260 when viewed from a location aft of the aircraft 100 looking forward along a direction parallel to the aircraft centerline 102. The perimeter of the area of each exhaust outlet 260 may be defined in part by the exhaust duct cowling 270 of the exhaust outlet 260. The outlet geometric center 266 of each one of the exhaust outlets 260 may be offset from the engine centerline 204 of the corresponding engine 202 by an exhaust outlet offset 268 distance.

In FIG. 4, the outlet geometric center 266 of each exhaust outlet 260 may be located vertically above the engine centerline 204, and which may be a result of the exhaust outlets 260 being located in the upper mold line 128 of the centerbody 120. As described in greater detail below, locating the exhaust outlets 260 in the upper mold line 128 may advantageously reduce airport noise that would otherwise occur if the exhaust outlets 260 were defined in the lower mold line 130 of the centerbody 120. The outlet geometric center 266 of each exhaust outlet 260 may also be located inboard of the engine centerline 204 of the corresponding engine 202. Locating each exhaust outlet 260 inboard of the corresponding engine centerline 204 may advantageously reduce asymmetric thrust as may occur in the event of one of the engines 202 becoming inoperable or producing less thrust than the other engine 202. In addition, positioning the exhaust outlets 260 such that the outlet geometric center 266 of each exhaust outlet 260 is inboard of the engine centerline 204 of the corresponding engine 202 may avoid direct impingement of the afterwardly-directed exhaust stream (not shown) onto the vertical stabilizers 170.

In FIG. 4, each exhaust outlet 260 may have a generally rectangular shape with rounded inner corners when the exhaust outlets 260 are viewed along a forward-facing direction. In the example shown, each exhaust outlet 260 may have an outlet width that is greater than an outlet height. However, the exhaust outlets 260 may be provided in any one a variety of shapes. For example, when viewed along a forward-facing direction, each exhaust outlet 260 may have the shape of a circle segment (not shown) which may result from each exhaust duct ramp 272 being generally planar and each exhaust duct cowling 270 having an arc-shaped cross section. In other examples not shown, each exhaust outlet 260 may have the shape of an oval, or each exhaust outlet 260 may have a flat upper surface and flat lower surface with semi-circular opposing ends coupling the flat upper and lower surface.

FIG. 5 is a forward-looking perspective view of the blended-wing-body configuration 110 aircraft 100 showing the air inlets 240 located along the centerbody leading edge portion 132. Also shown are the exhaust outlets 260 defined in the upper mold line 128 of the aircraft 100. As mentioned above, each exhaust outlet 260 may include an exhaust duct cowling 270 which has a forward end and an aft end. In an example, the forward end of the exhaust duct cowling 270 may be tangent with the upper mold line 128 of the centerbody 120. The aftwardly-extending remaining portion of the exhaust duct cowling 270 may protrude above the upper mold line 128 of the centerbody 120.

Referring still to FIG. 5, as mentioned above, each exhaust outlet 260 may have an exhaust duct ramp 272, the forward end of which may be located below the upper mold line 128. The aft end of the exhaust duct ramp 272 may smoothly blend into the aerodynamic contour of the upper mold line 128 of the centerbody 120. For example, the aft end of the exhaust duct ramp 272 may be tangent to the upper mold line 128. The exhaust duct cowling 270 and/or the exhaust duct ramp 272 may be formed of high-temperature material such as titanium alloy or other material capable of withstanding the high temperatures of the exhaust stream from the exhaust outlets 260. Advantageously, the location of the exhaust outlets 260 on the upper mold line 128 allows the centerbody 120 to provide partial blocking or shielding of exhaust noise such as when the aircraft 100 is on approach to an airport. In addition, as described in greater detail below, embedding the engines 202 within the centerbody 120 may reduce airport community noise relative to the noise generated by exposed engines of a conventional tube-and-wing aircraft.

Although not shown, in an alternative example, the exhaust outlets 260 may be defined in the lower mold line 130 of the centerbody 120 instead of on the upper mold line 128. In a further example not shown, the exhaust outlets 260 may be split between the upper mold line 128 and the lower mold line 130 of the centerbody 120. In a still further example not shown, the exhaust outlets 260 may be defined on the centerbody trailing edge portion 136. For example, the exhaust duct of each one of the engines 202 may blend into an exhaust duct cowling 270 that protrudes above the upper mold line 128 and protrudes below the lower mold line 130, and which may terminate at the centerbody trailing edge portion 136.

FIG. 6 is a side view of the blended-wing-body configuration 110 aircraft 100 in an example in which each air inlet 240 is located along the centerbody leading edge portion 132 of the centerbody 120. Also shown is an exhaust outlet 260 defined in the upper mold line 128 of the centerbody 120. As mentioned above, the aircraft 100 may include an inlet duct 244 fluidly coupling each air inlet 240 to a corresponding one of the engines 202. Each engine 202 may include an engine duct 210 (FIG. 9) which may surround the engine 202 and may function as the outer wall for a bypass stream 214 (FIG. 9) flowing through the engine 202, as described below. The aircraft 100 may additionally include an exhaust duct 264 fluidly coupling each engine 202 to a corresponding one of the exhaust outlets 260. Each exhaust duct 264 may be formed of a material (e.g., titanium alloy) capable of withstanding the high-temperature exhaust stream.

Figure 7:
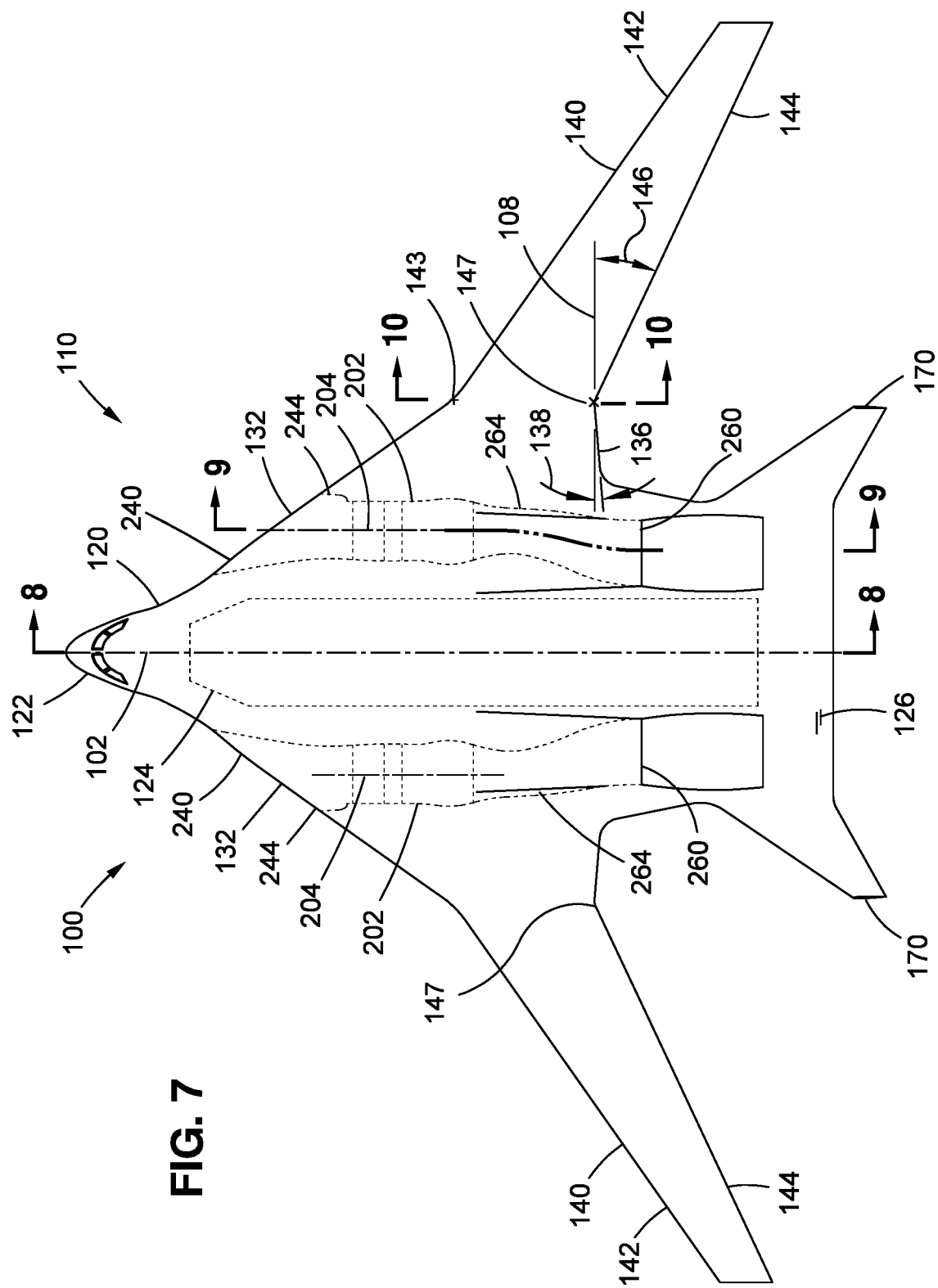
FIG. 7 is a top view of the aircraft of FIG. 1 illustrating a payload bay located between the pair of engines and further illustrating the wings integral with the centerbody.

FIG. 7 is a top view of the blended-wing-body configuration 110 aircraft 100 showing the general configuration of the aircraft 100 having the pair of wings 140 extending outwardly from the centerbody 120. As mentioned above, the centerbody 120 extends from the nose 122 to the aft portion 126. The aft portion 126 may include one or more tail surfaces such as the pair of vertical stabilizers 170 shown in FIGS. 1-7. However, the aircraft 100 may include one or more tail surfaces arranged in any one of a variety of different configurations, and is not limited to a pair of vertical tails as shown in the figures. For example, although not shown, the aircraft 100 may include a single centrally-located vertical tail (e.g., on the aircraft centerline 102) for yaw control, and may optionally include a horizontal stabilizer and/or elevator mounted on the vertical tail for pitch control.

In FIG. 7, the aircraft 100 includes a payload bay 124 located between the pair of engines 202. Also shown are the wings 140 smoothly blended into the centerbody 120. In the example shown, the wings 140 are swept aftwardly. However, in other examples not shown, the wings 140 may be swept forwardly, the wings 140 may be non-swept, or the wings 140 may be forwardly and afterwardly pivotable for adjusting the sweep angle of the wings 140. As shown in FIG. 7, the aircraft 100 may lack a distinct structural line or joint between each wing 140 and the centerbody 120. In the present disclosure, the dividing line (e.g., an imaginary forward-aft-extending line) between each wing 140 and the centerbody 120 is described as the wing-centerbody juncture 148.

Referring still to FIG. 7, the location of the wing-centerbody juncture 148 may be defined in terms of the trailing edge sweep angle of the centerbody 120 and the wings 140. The centerbody 120 has a centerbody trailing edge portion 136 having a centerbody trailing edge sweep angle 138 which is defined relative to the transverse axis 108 of the aircraft 100. The transverse axis 108 is oriented perpendicular to the aircraft centerline 102. In FIG. 7, each one of the wings 140 has a wing leading edge portion 142 and a wing trailing edge portion 144. The wing trailing edge portion 144 has a wing trailing edge sweep angle 146 defined relative to the transverse axis 108. In the example shown, the wing trailing edge sweep angle 146 may be different than the centerbody trailing edge sweep angle 138. On each side of the aircraft 100, the intersection of the wing trailing edge portion 144 with the centerbody trailing edge portion 136 may be described as the trailing edge planform break 147. The intersection of the wing leading edge portion 142 with the centerbody leading edge portion 132 may be described as the leading edge planform break 143. In the example shown, the leading edge planform break 143 is aligned with the trailing edge planform break 147. However, the blended-wing-body configuration 110 may be configured such that the leading edge planform break 143 is located further inboard or further outboard than the trailing edge planform break 147.

In some examples of the blended-wing-body configuration 110, the wing-centerbody juncture 148 may be located inboard of the trailing edge planform break 147. For example, the wing-centerbody juncture 148 may be located inboard of the trailing edge planform break 147 and slightly outboard of the exhaust outlet 260. In other examples, the wing-centerbody juncture 148 may be located at the leading edge planform break 143, or outboard of the leading edge planform break 143. Alternatively, the wing-centerbody juncture 148 on each side of the aircraft 100 may be located at the leading edge planform break 143. In another example, the wing-centerbody juncture 148 may be located inboard or outboard of the leading edge planform break 143. In a still further example described in greater detail below, the location of the wing-centerbody juncture 148 on each side of the aircraft 100 may be defined in terms of the airfoil thickness-to-chord ratio of the wings 140 relative to the airfoil thickness-to-chord ratio of the centerbody 120.

As mentioned above, the centerbody 120 of the aircraft 100 may include a payload bay 124. In some examples, the aircraft 100 may be configured for use as a subsonic commercial or military freighter for carrying cargo in the payload bay 124. Advantageously, the shape of the centerbody 120 allows for a large payload bay 124. The relatively wide shape of the centerbody 120 allows for a relatively wide payload bay 124 capable of carrying cargo having a larger width than the cargo that may be carried in the fuselage of a tube-and-wing aircraft. In a further example, the aircraft 100 may be configured as a tanker aircraft providing refueling support in a military or commercial application. Alternatively or additionally, the payload bay 124 may be configurable as a passenger cabin (not shown) having seats for carrying passengers. Although the nose 122 of the aircraft 100 is shown having a cockpit for a flight crew for piloting the aircraft 100, the aircraft 100 may optionally be configured and/or operated as an unmanned aerial vehicle (UAV) which may be remotely controlled. Regardless of whether the aircraft 100 is unmanned or piloted by a flight crew, the aircraft 100 may be configured for use in a variety of civilian, commercial, governmental, and/or military applications.

In FIG. 7, each inlet duct 244 may be generally aligned with the engine centerline 204 of the corresponding engine 202 to reduce or avoid the disruption of airflow into the engine 202. Each exhaust duct 264 may have a slight S-shaped configuration when the aircraft 100 is viewed from a top-down direction. The S-shaped configuration may allow the exhaust from each engine 202 to smoothly flow to the exhaust outlet 260 which may be located inboard of the engine centerline 204 of the corresponding engine 202. As mentioned above, positioning each exhaust outlet 260 at a location that is inboard of the corresponding engine centerline 204 may reduce asymmetric thrust that may occur if one engine 202 becomes inoperable.

FIG. 8 is a sectional view of the centerbody 120 of the blended-wing-body configuration 110 aircraft 100 of FIG. 7 taken along the aircraft centerline 102. In the example shown, the centerbody 120 has an airfoil-shaped cross section at the aircraft centerline 102. The upper mold line 128 of the centerbody 120 may have a relatively higher degree of curvature than the lower mold line 130 and which may result in the generation of lift.

In FIG. 9, shown is a sectional view of the blended-wing-body configuration 110 aircraft 100 taken along an engine centerline 204 and showing an engine 202 mounted within the centerbody 120 between the upper mold line 128 and the lower mold line 130. Each engine 202 may be enclosed within an engine duct 210 that is internal to the centerbody 120. Also shown is an inlet duct 244 fluidly coupling the air inlet 240 to the engine 202, and an exhaust duct 264 fluidly coupling the engine 202 to an exhaust outlet 260.

In FIG. 9, each engine 202 may be configured as a turbofan engine having at least one fan 212 and a core 216. The fan 212 may be rotatably driven by the core 216 for forcing the bypass stream 214 of air through an annular passage between the engine duct 210 and the core 216. The core 216 has one or more turbines 224, 226 and one or more compressors 220, 222. For example, the core 216 may include a low-pressure compressor 220, a high-pressure compressor 222, a low-pressure turbine 224, and a high-pressure turbine 226. Each one of the compressors 220, 222 and turbines 224, 226 are rotor discs having multiple blades rotating at relatively high speeds. The rotating compressors 220, 222 and turbines 224, 226 draw a core stream 218 through the core 216. The combination of the bypass stream 214 and the efflux or exhaust of the core stream 218 results in thrust that propels the aircraft 100.

In any one of the examples disclosed herein, the engines 202 may each have a bypass ratio of greater than 5. For example, each one of the engines 202 may have a bypass ratio in the range of from about 5-20. However, in other examples, each one of the engines 202 may have a bypass ratio of less than 5, or a bypass ratio higher than 20. The bypass ratio may be described as the ratio of the mass flow rate of the bypass stream 214 to the mass flow rate of the core stream 218. It should be noted that in any one of the aircraft 100 configurations disclosed herein, the engines 202 are not limited to being configured as turbine engines embedded within the centerbody 120, but may include alternative engine configurations. For example, one or more of the engines 202 of the aircraft 100 may be configured as a gas generator (not shown) embedded within the centerbody 120 and configured to generate electricity for hybrid electric propulsion.

Referring still to FIG. 9, the aircraft 100 has an aircraft center of gravity 104. Each one of the engines 202 has an engine center of gravity 208 which may be longitudinally positioned (i.e., along a direction parallel to the aircraft centerline 102—FIG. 8) within an engine center of gravity offset 209. In some examples, the engine center of gravity 208 may be longitudinally positioned within a distance from the aircraft center of gravity 104 of 20 percent (i.e., between 80-120 percent) of a horizontal distance from the nose forwardmost point of the nose 122 (FIG. 8) to the aircraft center of gravity 104. The horizontal distance may be measured along the aircraft centerline 102 and may extend between the aircraft center of gravity 104 and an imaginary vertical plane (e.g., a reference datum—not shown) oriented perpendicular to the aircraft centerline 102 and located on the outer mold line of the nose 122. In the present disclosure, the aircraft center of gravity 104 is the empty weight center of gravity and is based on the empty weight of the aircraft 100 which may be described as the weight of the aircraft 100 without fuel, cargo, or passengers in the aircraft 100. However, the engine center of gravity 208 may be longitudinally positioned at any location relative to the aircraft center of gravity 104, and is not limited to the above-described arrangement.

Advantageously, the internal location of the engines 202 within the centerbody 120 locates the thrust line of each engine 202 vertically near the aircraft center of gravity 104. In addition, the internal location of the engines 202 within the centerbody 120 of the aircraft 100 provides the opportunity to optimize the longitudinal location of the engine center of gravity 208. For example, the location of each engine center of gravity 208 longitudinally near the aircraft center of gravity 104 may enhance the flight characteristics of the aircraft. In addition, the above-described and illustrated location of the engines 202 may reduce the thrust pitching moment induced by the engines 202 relative to a large thrust pitching moment induced by externally-mounted engines (not shown). Furthermore, the internal location of the engines 202 within the centerbody 120 of the presently-disclosed aircraft 100 may reduce the length and complexity of the primary load-carrying structure (not shown) supporting the engines 202 within the centerbody 120, relative to longer and more complex load-carrying structure that may be required to support externally-mounted engines (not shown) such as on pylons protruding upwardly from an aft end of an aircraft. In the presently-disclosed aircraft configurations, the reduced length and complexity of the engine-supporting structure may result in a reduction in aircraft weight relative to a similar aircraft having externally mounted engines.

In addition to the above-noted advantages regarding engine center of gravity, thrust pitching moment, and aircraft weight, the internal location of the engines 202 within the centerbody 120 may allow for improved accessibility to the engines 202 (e.g., for engine maintenance and/or removal) relative to more difficult accessibility for externally-mounted engine supported on upwardly-extending pylons (not shown). Even further, the internal location of the engines 202 within the centerbody 120 may reduce exposure of the engines 202 to environmental effects or damage from external objects. For example, the internal location of the engines 202 within the centerbody 120 may eliminate the potential for contact of the engines 202 with objects and/or vehicles at an airport. Additionally, the internal location of the engines 202 within the centerbody 120 may result in the aircraft 100 generating less noise during take-off and landing which may allow the aircraft 100 to be operated earlier and later in the day, and possibly during airport curfew hours. The internal location of the engines 202 on opposite sides of the centerbody 120 may improve survivability of each engine 202 in the event of an uncontained engine failure (e.g., rotor blade departure) of one of the engines 202.

Referring still to FIG. 9, each air inlet 240 may be located at least partially below a leading edge forwardmost point 134 of the corresponding centerbody leading edge portion 132 and which results in the inlet geometric center 246 (FIG. 3) of each air inlet 240 being located below the engine centerline 204 of the corresponding engine 202. Advantageously, locating each air inlet 240 below the leading edge forwardmost point 134 on the centerbody leading edge portion 132 avoids disrupting the aerodynamics of the oncoming airflow passing over the wings 140. Furthermore, locating each air inlet 240 below the leading edge forwardmost point 134 on the corresponding centerbody leading edge portion 132 may avoid the potential blanketing of airflow into the air inlets 240 that may occur at high angles of attack if the air inlets 240 were located above the leading edge forwardmost point 134 of the centerbody leading edge portions 132. In an example not shown, each air inlet 240 air may be located on the corresponding centerbody leading edge portion 132 such that the inlet geometric center 246 is vertically centered on the leading edge forwardmost point 134 such that a portion (e.g., approximately half) of the inlet cross-sectional area is located above the leading edge forwardmost point 134 and the remaining portion of the inlet cross-sectional area is located below the leading edge forwardmost point 134 of the air inlet 240.

Referring to FIGS. 7-10, as mentioned above, the location of the wing-centerbody juncture 148 (FIG. 7) on each side of the aircraft 100 may be defined in terms of the airfoil thickness-to-chord ratio of the wings 140 (FIG. 10) and centerbody 120 (FIG. 9). As mentioned above, FIG. 9 shows a cross section of the centerbody 120 of the aircraft 100 at the location of the engine centerline 204. FIG. 10 shows a cross section of a wing 140 of the aircraft 100 (FIG. 9). The airfoil thickness-to-chord ratio represents the ratio of the airfoil thickness to the airfoil chord. The airfoil chord of an airfoil may be described as the distance from the leading edge of the airfoil to the trailing edge of the airfoil. The airfoil thickness may be described as the maximum thickness of the airfoil along the airfoil chord. In one example of the aircraft 100, the centerbody 120 may have an airfoil thickness-to-chord ratio of at least 10 percent, and each wing 140 may have an airfoil thickness-to-chord ratio of less than 10 percent. In this regard, the wing-centerbody juncture 148 on each side of the aircraft 100 may be defined as the location where the airfoil thickness-to-chord ratio changes from less than 10 percent to at least 10 percent.

Figure 11:
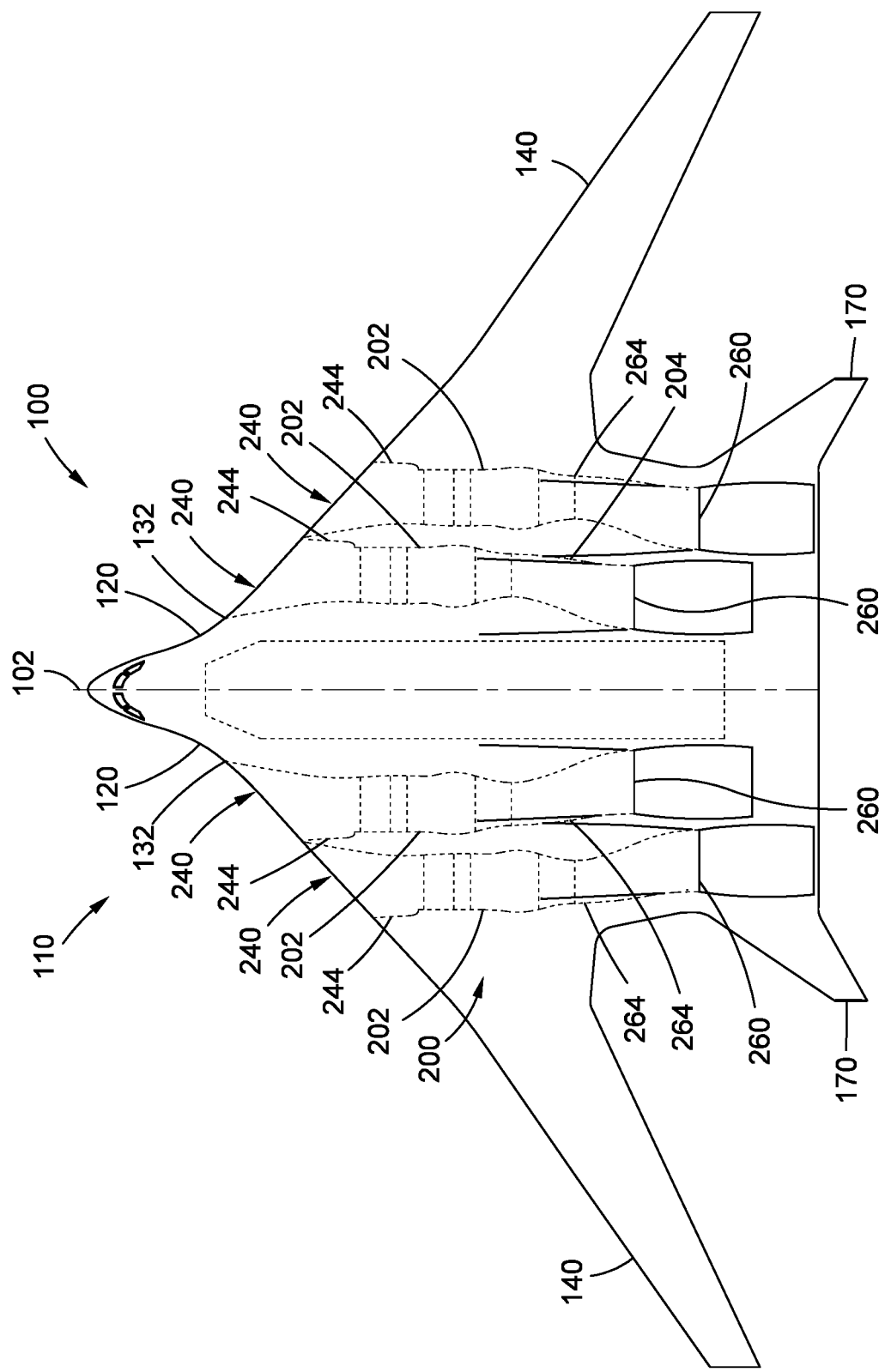
FIG. 11 is a top view of an example of a blended-wing-body aircraft having two (2) pairs of engines located on laterally opposite sides of the aircraft centerline.

FIG. 11 is a top view of an example of a blended-wing-body configuration 110 aircraft 100 in which the propulsion system 200 includes two (2) pairs of engines 202 located on laterally opposite sides of the aircraft centerline 102. In the present disclosure, the lateral direction may be described as a direction in the horizontal plane and oriented parallel to the transverse axis 108 (FIG. 7) of the aircraft 100. The longitudinal direction may be described as a forward-aft direction oriented parallel to the aircraft centerline 102. In FIG. 11, the adjacent pair of engines 202 on each side of the aircraft centerline 102 may be longitudinally staggered or offset from each other. Longitudinally offsetting the adjacent engines 202 may prevent an uncontained engine failure (e.g., due to rotor blade departure from one of the compressors 220, 222 and/or turbines 224, 226—FIG. 9) of one engine 202 from affecting the operability of the adjacent engine 202. The increased redundancy provided by two (2) pairs of engines 202 on each side of the aircraft 100 may enhance the reliability of the aircraft 100 propulsion system 200.

In the example aircraft 100 of FIG. 11, the engines 202 may be provided in any one of the above-describe configurations including, but not limited to, turbine engines. For example, one or more pairs of the engines 202 embedded within the centerbody 120 may be configured as the above-described turbofan engine shown in FIG. 9, and may be of any suitable bypass ratio. In still other examples, one or more of the engines 202 embedded within the centerbody 120 on each side of the aircraft centerline 102 may be provided as a gas generator (not shown) for generating electricity for a hybrid engine (not shown) for electric propulsion. For example, for an aircraft 100 having two (2) pairs of engines 202 on each side of the aircraft centerline 102 as shown in FIG. 11, one of the engines 202 on each side of the aircraft 100 may be a turbine engine and the adjacent engine 202 may be a gas generator for hybrid electric propulsion. In a still further example not shown, an aircraft 100 may have three (3) pairs of engines 202 embedded within the centerbody 120 on each side of the aircraft centerline 102. For example, two (2) of the three (3) engines 202 on each side of the aircraft centerline 102 may be turbine engines, and the third of the three (3) engines 202 may be a gas generator (not shown) for a hybrid engine. As may be appreciated, the aircraft 100 may be configured to include any number of engines 202 embedded within the centerbody 120, and is not limited to the above-described and/or illustrated examples.

In any of the aircraft configurations disclosed herein, the propulsion system 200 may be configured such that each engine 202 may have a dedicated inlet duct 244 fluidly coupling an air inlet 240 to the engine 202, and a dedicated exhaust duct 264 fluidly coupling the engine 202 to an exhaust outlet 260. However, it is contemplated that an aircraft 100 may be provided with a propulsion system 200 in which one or more of the engines 202 share at least a portion of an inlet duct 244 and/or at least a portion of an air inlet 240 with at least one other engine 202 of the propulsion system 200. Alternatively or additionally, the propulsion system 200 may be configured such that one or more of the engines 202 share at least a portion of an exhaust duct 264 and/or at least a portion of an exhaust outlet 260 with at least one other engine 202 of the propulsion system 200. As an example, for the aircraft 100 of FIG. 11 having two (2) pairs of engines 202, the centerbody leading edge portion 132 on each side of the aircraft centerline 102 may have a single air inlet 240 (not shown). Each one of the engines 202 on each side of the aircraft centerline 102 may have a dedicated inlet duct 244 that may be coupled to the single air inlet 240.

Figure 12:
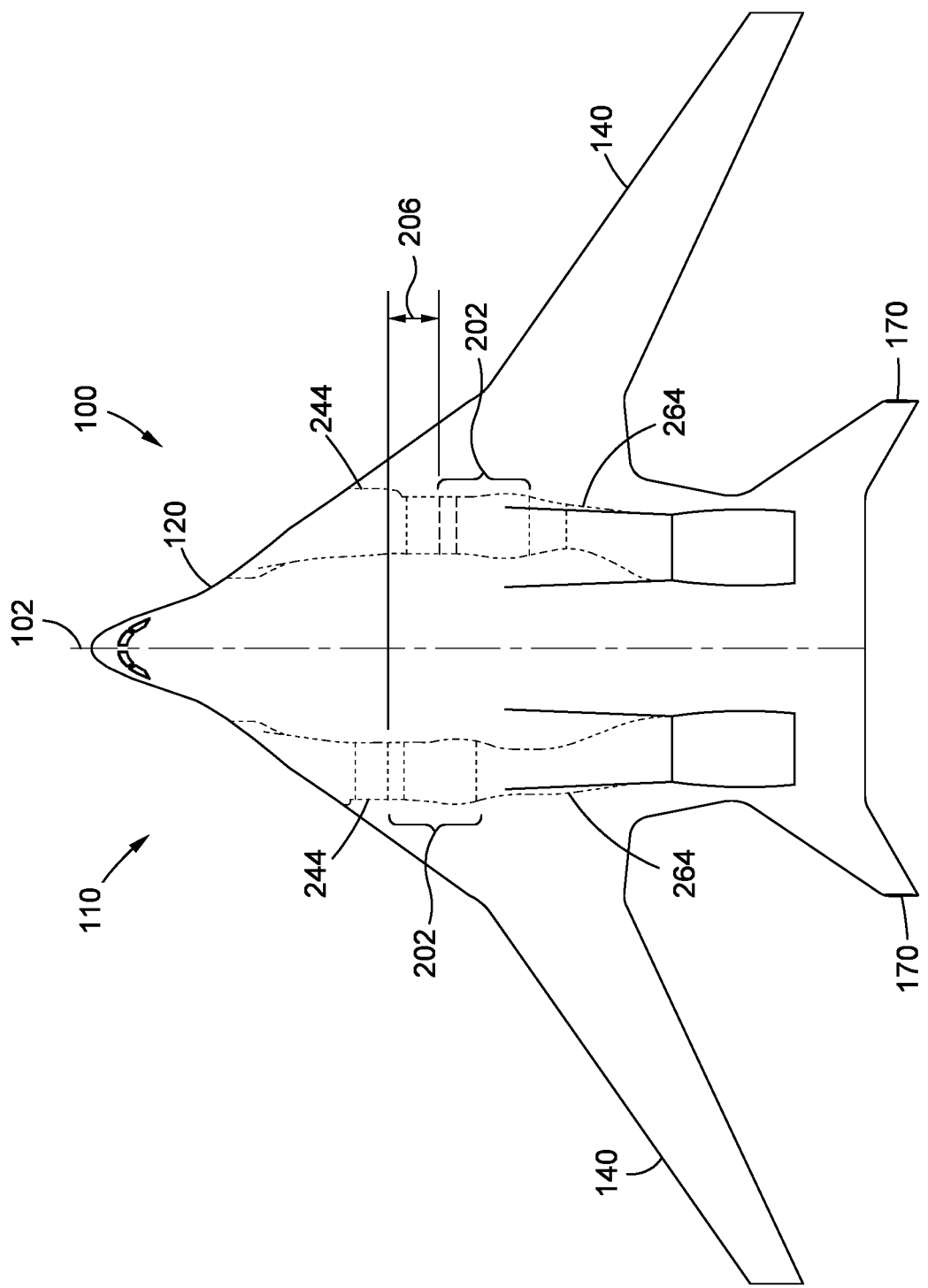
FIG. 12 is a top view of an example of a blended-wing-body aircraft having a pair of engines longitudinally offset from each other.

FIG. 12 is a top view of an example of a blended-wing-body configuration 110 aircraft 100 having a pair of engines 202 that are longitudinally staggered or offset from each other. The engines 202 are located on laterally opposite sides of the aircraft centerline 102. If configured as turbofan engines, the engines 202 may be longitudinally offset by an engine offset 206 distance that may prevent an uncontained failure of the fan(s) 212 (FIG. 9), the compressor(s) 220, 222 (FIG. 9), and/or the turbines(s) to 24, 226 (FIG. 9) of one engine 202 from affecting the operability of the other engine 202. For example, the engines 202 may be longitudinally offset by an engine offset 206 distance such that the turbines 224, 226 of the engine 202 on one side of the aircraft centerline 102 are longitudinally forward of the fan 212 of the engine 202 on the opposite side of the aircraft centerline 102.

Figure 13:
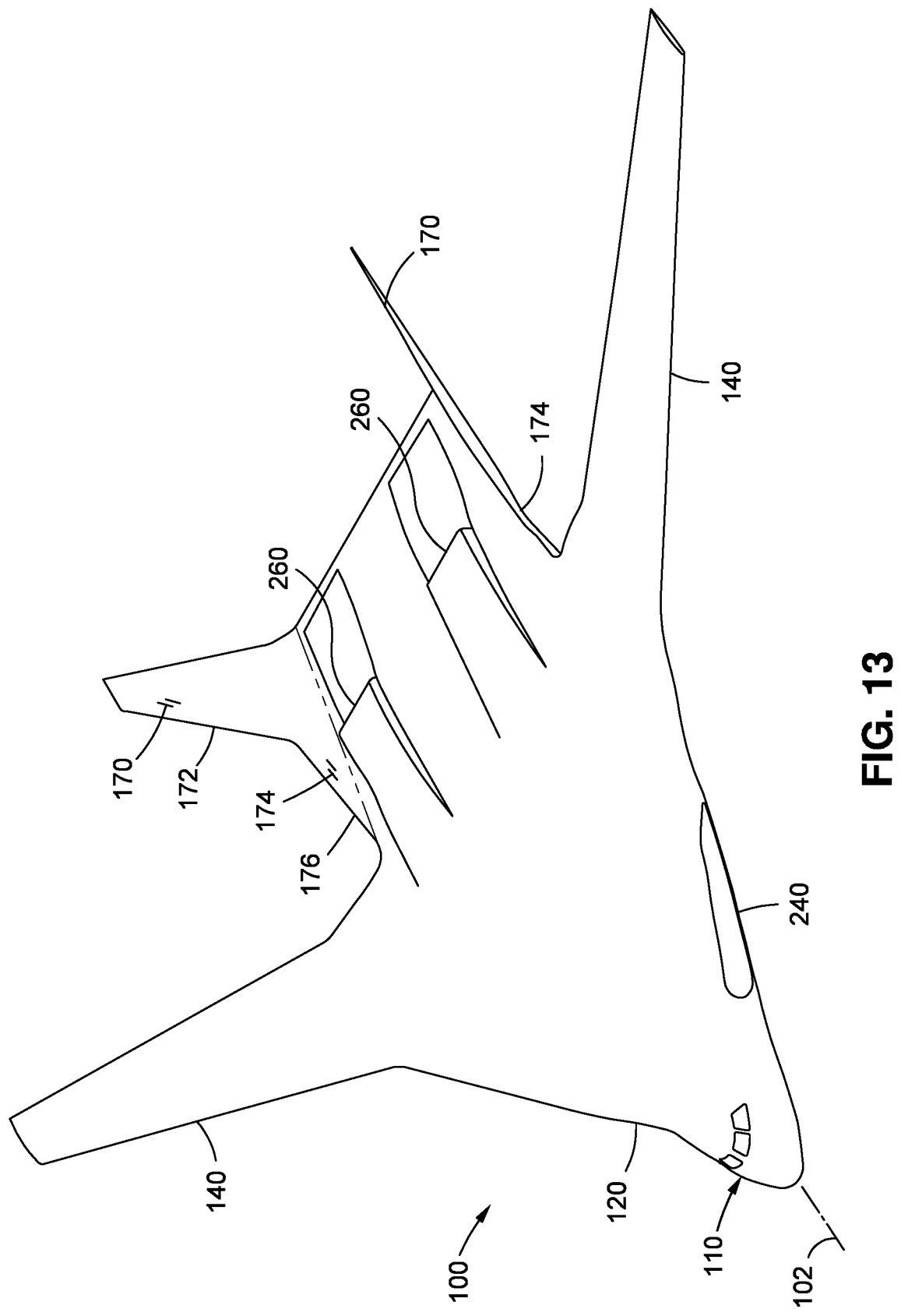
FIG. 13 is an aft-looking perspective view of an example of a blended-wing-body aircraft having strakes extending forwardly from the vertical stabilizers for acoustically blocking at least a portion of the exhaust noise emanating from the exhaust outlets.
Figure 14:
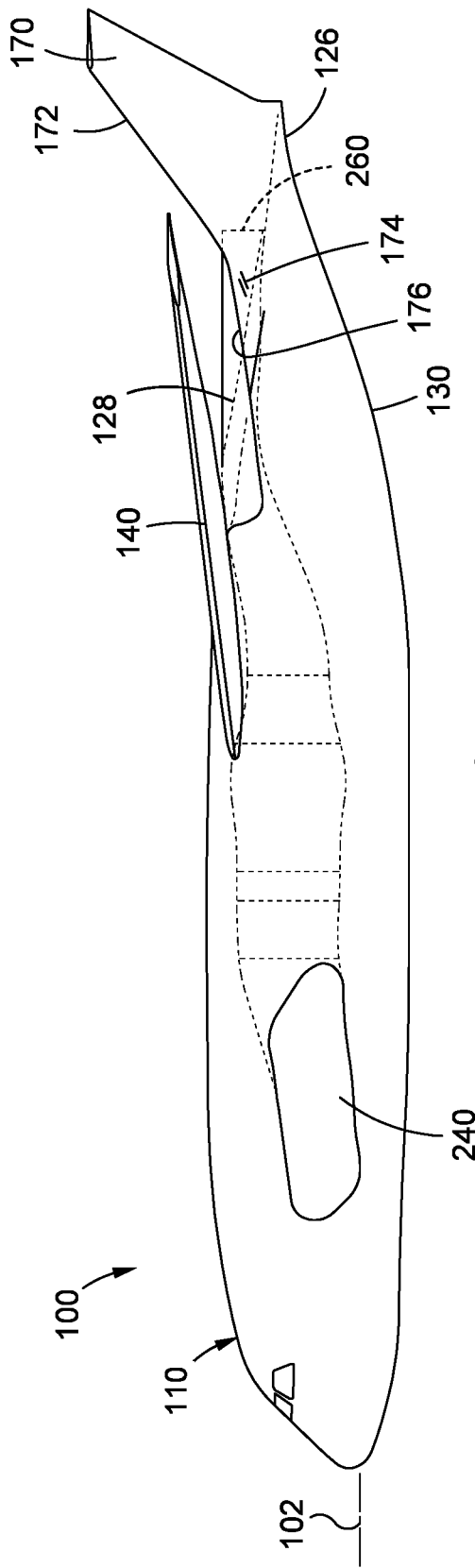
FIG. 14 is a side view of the blended-wing-body aircraft of FIG. 13 and illustrating the strakes longitudinally overlapping the exhaust outlets for acoustically blocking exhaust noise.

Referring to FIGS. 13-14, shown is an example of a blended-wing-body configuration 110 aircraft 100 having strakes 174 extending forwardly from the vertical stabilizers 170. As described above, the aircraft 100 may include a pair of the vertical stabilizers 170 located on opposite sides of the aircraft centerline 102. The vertical stabilizers 170 may be canted (i.e., non-vertically oriented as shown) or the vertical stabilizers 170 may be vertically oriented (not shown). Each one of the vertical stabilizers 170 has a stabilizer leading edge 172. In the example of FIG. 14, the pair of exhaust outlets 260 may be located at a position that is longitudinally aft of the vertical stabilizers 170. More specifically, the aft end of the exhaust ducts 264 may be located aft of the stabilizer leading edges 172. For examples of the aircraft 100 having strakes 174, the aft end of the exhaust ducts 264 may be located aft of the strake leading edges 176.

Figure 15:
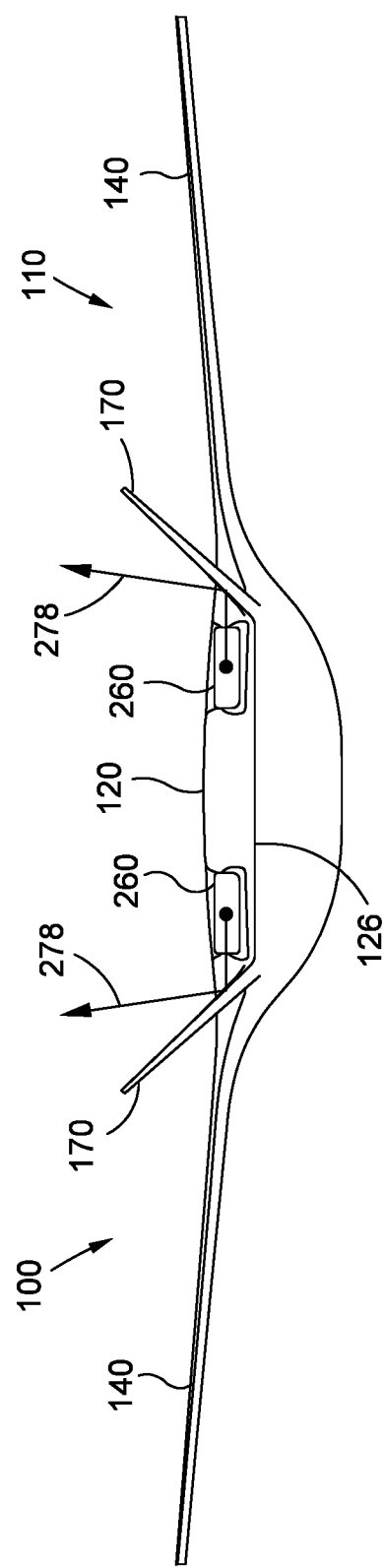
FIG. 15 is a forward-looking end view of the blended-wing-body aircraft of FIG. 13 and illustrating the strakes and/or vertical stabilizers acoustically blocking exhaust noise from the exhaust outlets.

FIG. 15 is a forward-looking end view of the aircraft 100 showing the vertical stabilizers 170 and/or the strakes 174 (FIGS. 14-15) acoustically blocking at least a portion of the exhaust noise emanating from the exhaust outlets 260. The exhaust noise is partially represented by the acoustic emission vectors 274 which are shown extending laterally (e.g., sideway) from the exhaust outlets 260. However, for exhaust outlets 260 defined in the upper mold line 128 (FIG. 14) of the aft portion 126 of the centerbody 120, exhaust noise may emanate from the exhaust outlets 260 generally omnidirectionally except for in the downward direction due to at least partial blocking of some of the exhaust noise by the upper surface of the centerbody 120. The acoustic emission vectors 274 that are shown may reflect off of the vertical stabilizers 170 and/or the strakes 174 and may be deflected in a generally upward direction, depending upon the orientation of the vertical stabilizers 170. Advantageously, the generally upward deflection of the exhaust noise may reduce the amount of airport community noise generated by the aircraft 100, thereby potentially allowing the aircraft 100 to operate during airport curfew hours such as during the early morning hours and/or late at night.

Figure 16:
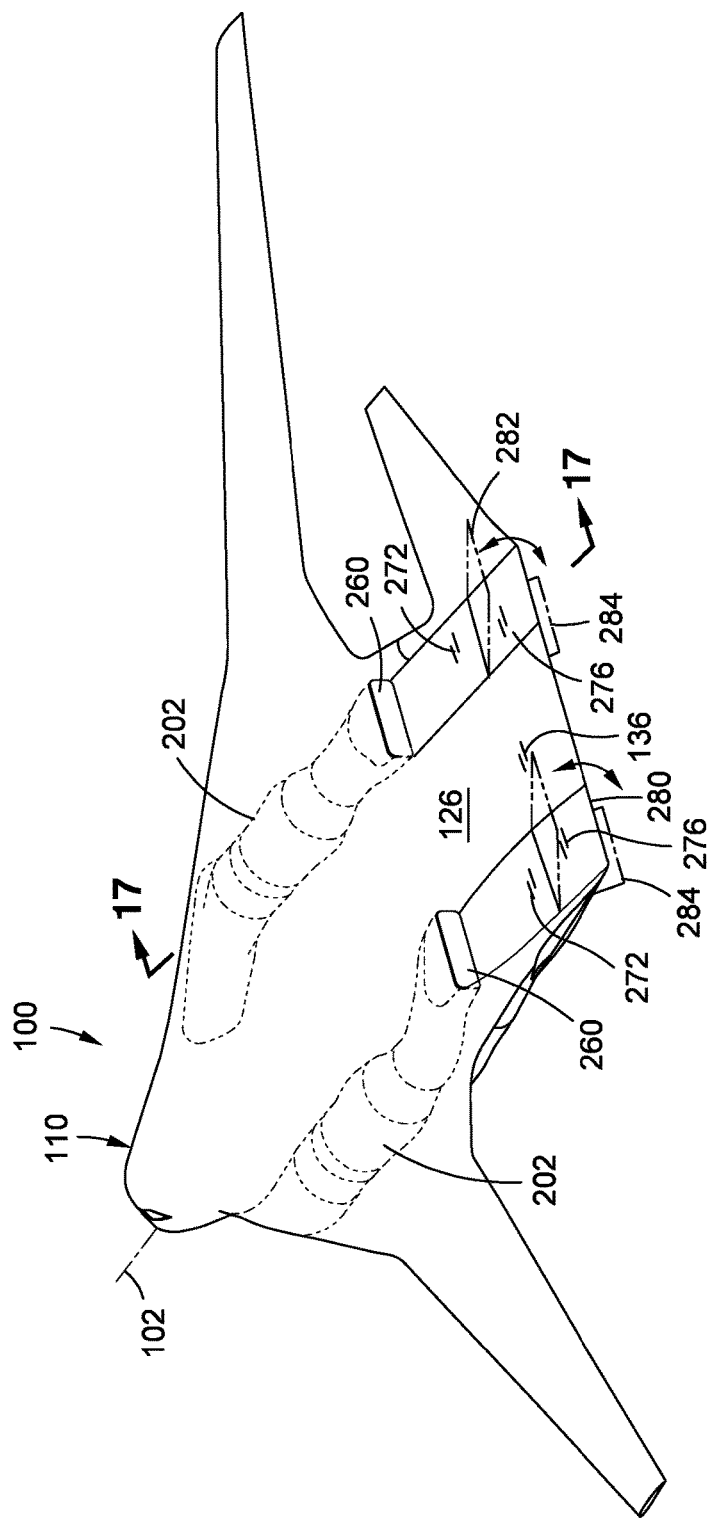
FIG. 16 is a top-down forward perspective view of the aircraft of FIG. 1 and illustrating a pair of thrust-vectoring flaps located downstream respectively of the pair of exhaust outlets and configured for steering the exhaust stream from the engines.
Figure 17:
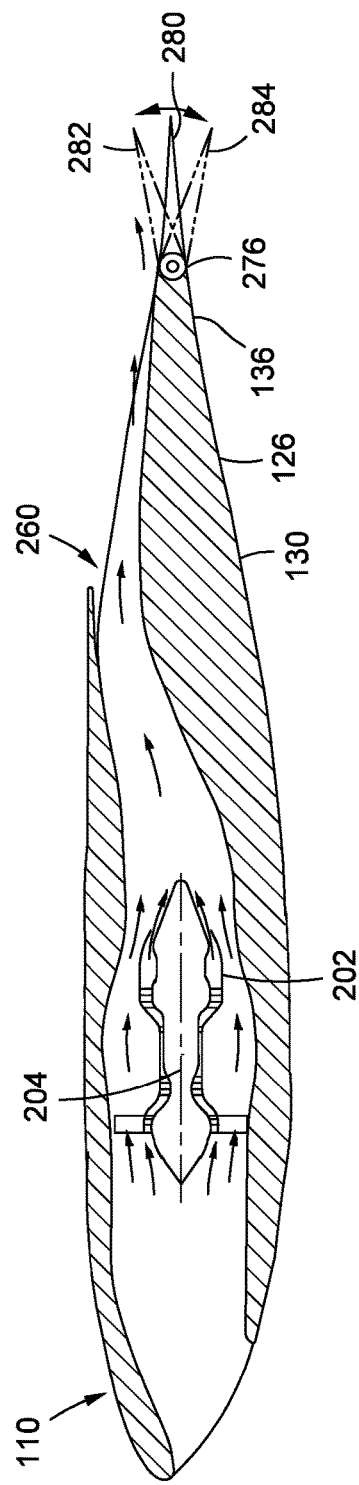
FIG. 17 is a sectional view of the aircraft taken along line 17-17 of FIG. 16 and illustrating one of the thrust-vectoring flaps being vertically pivotable from a neutral position to an upward position and/or to a downward position.

FIGS. 16-17 illustrate an example of a blended-wing-body configuration 110 aircraft having a pair of thrust-vectoring flaps 276 (e.g., blown flaps) for varying or steering the direction of the exhaust streams (e.g., engine thrust) discharged from the engines 202. FIG. 16 is a top-down view of the aircraft 100. FIG. 17 is a sectional view through the engine centerline 204 and illustrating one of the thrust-vectoring flaps 276. The pair of thrust-vectoring flaps 276 are mounted proximate the centerbody trailing edge portion 136 and are located downstream respectively of the pair of exhaust outlets 260. In this regard, the thrust-vectoring flaps 276 are located downstream of the exhaust duct ramps 272. In the example shown, the aftmost edge of each one of the thrust-vectoring flaps 276 terminates at a location coincident with the aftermost edge of the centerbody trailing edge portion 136. However, in examples not shown, the aftermost edge of the thrust-vectoring flaps 276 may terminate at a location that is forward of or aft of the aftermost edge of the centerbody trailing edge portion 136.

In FIGS. 16-17, the thrust-vectoring flaps 276 are pivotable in order to vary the direction of the exhaust streams that are respectively discharged by the pair of engines 202. The thrust-vectoring flaps 276 may be independently pivotable and may be actuated in coordination with each other. In the example shown, the thrust-vectoring flaps 276 are pivotable from a neutral position 280 to an upward position 282 and/or to a downward position 284. In the neutral position 280, the aftermost edge of the thrust-vectoring flaps 276 may be aligned with or coincident with the aftermost edge of the centerbody trailing edge portion 136. Each one of the thrust-vectoring flaps 276 may be pivotable about a pivot axis (not shown) oriented perpendicular to the aircraft centerline 102 (FIG. 16). The thrust-vectoring flaps 276 may be pivotable about the pivot axis from the neutral position 280 to an upward position 282 of up to +45 degrees or more, and/or from the neutral position 280 to a downward position 284 of up to −45 degrees or more. When the thrust-vectoring flaps 276 are pivoted into an upward position 282, the exhaust streams from the engine 202 impinge on the thrust-vectoring flaps 276 which may generate a downward force on the aft portion 126 of the centerbody 120, causing the nose of the aircraft 100 to pitch upwardly. When the thrust-vectoring flaps 276 are pivoted into a downward position 284, at least a portion of the exhaust streams from each engine 202 may tend to follow the downwardly deflected surfaces of the thrust-vectoring flaps 276 due to the Coanda effect, and which may also result in an area of low pressure above the thrust-vectoring flaps 276 and an area of higher pressure below the thrust-vectoring flaps 276 (due to the airstream flowing along the lower mold line 130), the result of which may urge the aft portion 126 of the centerbody 120 upwardly causing the nose of the aircraft 100 to pitch downwardly. In this manner, the thrust-vectoring flaps 276 may increase the pitch controllability and/or maneuverability of the aircraft 100.

Figure 18:
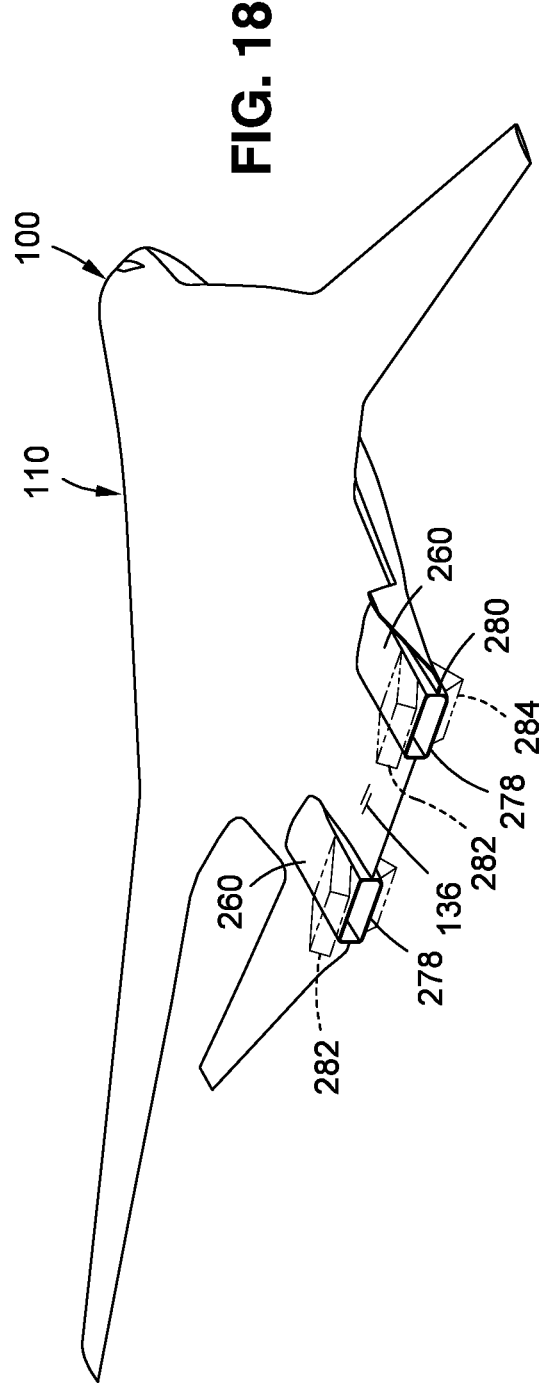
FIG. 18 is a top-down forward perspective view of the aircraft of FIG. 1 and illustrating a pair of thrust-vectoring exhaust nozzles located proximate the centerbody trailing edge portion and configured for steering the exhaust stream from the engines.
Figure 19:
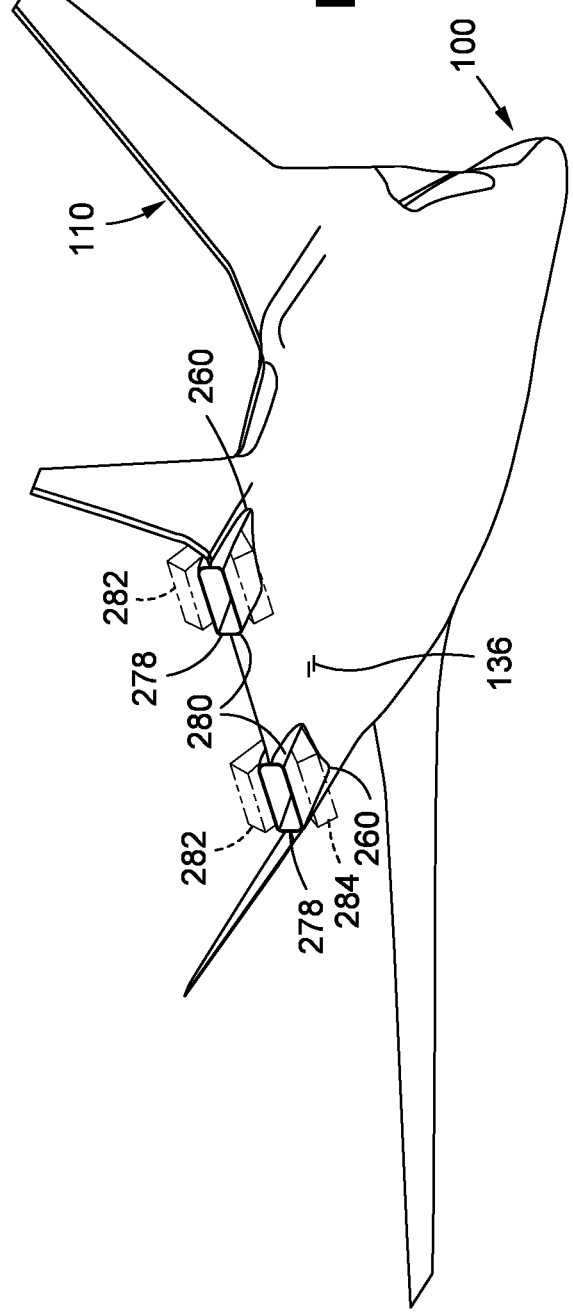
FIG. 19 is a bottom-up forward perspective view of the aircraft of FIG. 18 showing the thrust-vectoring exhaust nozzles.

Referring to FIGS. 18-21, shown is an example of blended-wing-body configuration 110 aircraft in which the pair of exhaust outlets 260 include a pair of thrust-vectoring exhaust nozzles 278 for steering the direction of the exhaust streams from the engines 202 (FIG. 17). FIG. 18 is a top-down perspective view of the aircraft 100 and FIG. 19 is a bottom-up perspective view of the aircraft 100 showing the pair of thrust-vectoring exhaust nozzles 278 located proximate the centerbody trailing edge portion 136. In the example shown, the aftermost edge of the thrust-vectoring exhaust nozzles 278 may terminate at the same location as the aftermost edge of the centerbody trailing edge portion 136, similar to the above-described arrangement of the thrust-vectoring flaps 276 (FIGS. 16-17). However, in examples not shown, the thrust-vectoring exhaust nozzles 278 may be mounted such that the aftermost edge of the thrust-vectoring exhaust nozzles 278 is located forward of the aftermost edge of the centerbody trailing edge portion 136, or the aftermost edge of the thrust-vectoring exhaust nozzles 278 may be located aft of the aftermost edge of the centerbody trailing edge portion 136. Although shown having a generally rectangular cross-sectional shape, the thrust-vectoring exhaust nozzles 278 may be provided in any one a variety of cross-sectional shapes including, but not limited to, an oval shape or a circular shape.

Figure 20:
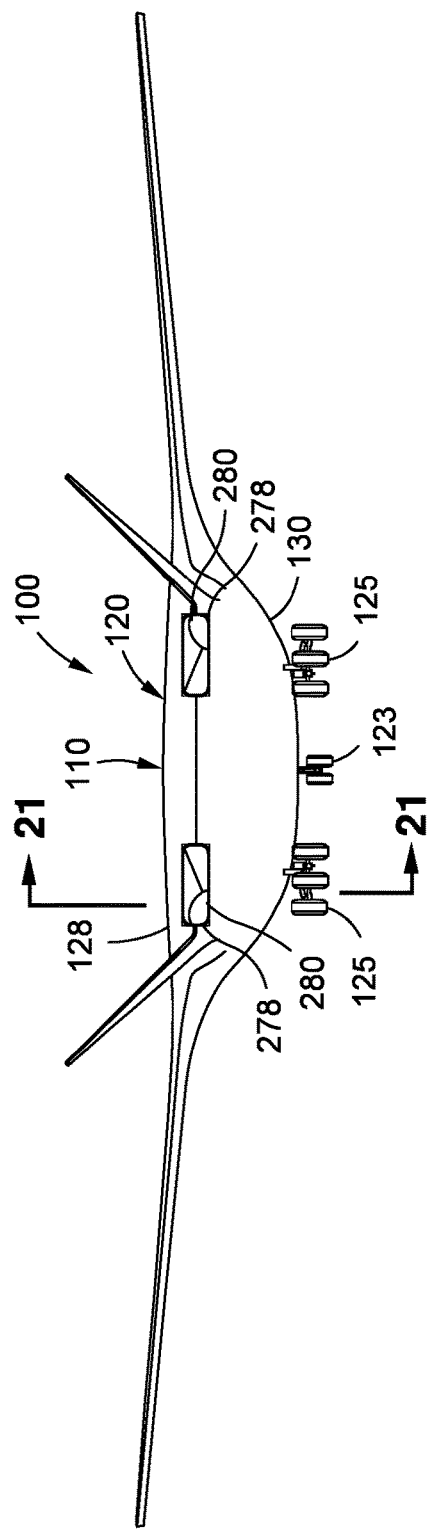
FIG. 20 is a forward-looking end view of the aircraft of FIGS. 18-19 and illustrating the thrust-vectoring exhaust nozzles in the neutral position.
Figure 21:
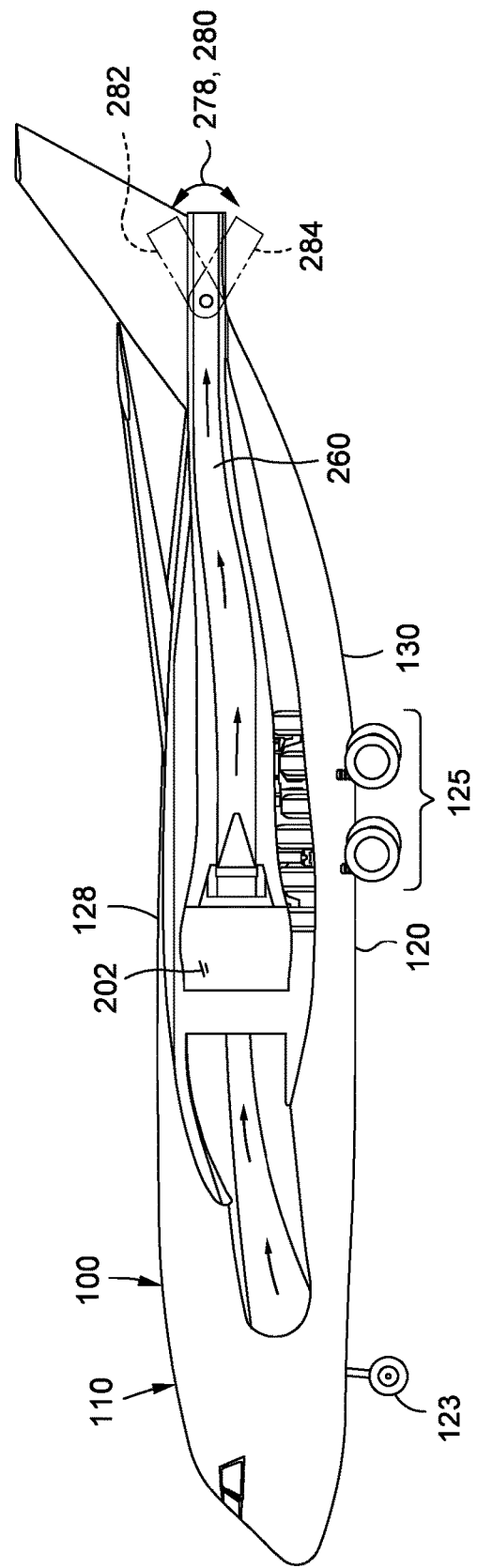
FIG. 21 is a sectional view of the aircraft taken along line 21-21 of FIG. 20 and illustrating a thrust-vectoring exhaust nozzle pivotably mounted to the aft portion of the centerbody.

FIG. 20 is an end view of the aircraft 100 showing the thrust-vectoring exhaust nozzles 278 in the neutral position 280. FIG. 21 is a sectional view of the aircraft 100 also showing the thrust-vectoring exhaust nozzles 278 in the neutral position 280. Also shown in FIG. 21 is an example of a nose landing gear 123 in the extended position. In addition, the main landing gear 125 as shown in the extended position and also shown retracted within the centerbody 120. In the retracted position, the main landing gear 125 may be positioned within the centerbody 120 without protruding beyond the upper mold line 128 and/or the lower mold line 130 of the centerbody 120.

In FIGS. 18-21, the thrust-vectoring exhaust nozzles 278 are pivotable in coordination with each other for varying the direction of the exhaust streams for increasing the pitch controllability of the aircraft 100, similar to the above-described arrangement of the thrust-vectoring flaps 276. Each one of the thrust-vectoring exhaust nozzles 278 is vertically pivotable from the neutral position 280 to an upward position 282 and/or to a downward position 284. Each thrust-vectoring exhaust nozzle 278 may be pivotable about a pivot axis (not shown) oriented perpendicular to the forward-aft direction of the aircraft 100. The thrust-vectoring exhaust nozzles 278 may be pivoted from the neutral position 280 to an upward position 282 of up to +45 degrees or more, and/or from the neutral position 280 to the downward position 284 above to −45 degrees or more. In some examples, each one of the thrust-vectoring exhaust nozzles 278 may be a unitary structure that pivots up and down about a pivot axis as mentioned above. In an alternative example not shown, each one of the thrust-vectoring exhaust nozzles 278 may include upper and lower nozzle surfaces that pivot up and downwardly independently on their own hinges, but in coordination with each other for steering the exhaust stream.

Figure 22:
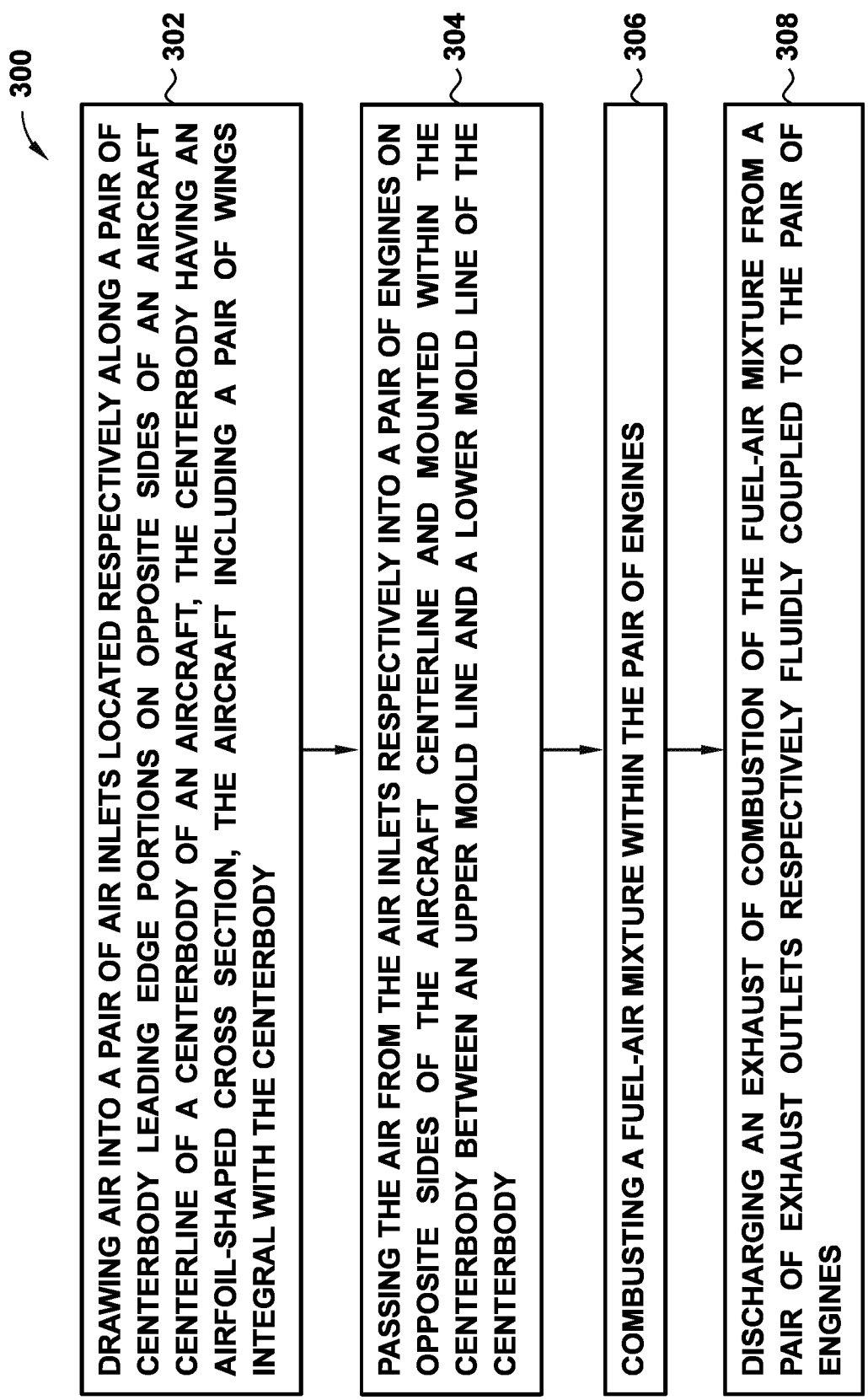
FIG. 22 is a flowchart of operations included in a method of operating an aircraft having a blended-wing-body configuration.

FIG. 22 is a flowchart of operations included in a method 300 of operating an aircraft 100 having a blended-wing-body configuration 110. Step 302 of the method 300 includes drawing air into at least one pair of air inlets 240 located respectively along a pair of centerbody leading edge portions 132 respectively on opposite sides of the aircraft centerline 102 of the centerbody 120 of the aircraft 100. As described above and shown in the figures, the centerbody 120 has an airfoil-shaped cross section. The aircraft 100 includes a pair of wings 140 that are integral with the centerbody 120.

In some examples, step 302 of drawing the air into the pair of air inlets 240 may include drawing the air into the pair of air inlets 240 located at least partially below a leading edge forwardmost point 134 respectively of the pair of centerbody leading edge portions 132. For example, FIG. 9 illustrates the entirety of an air inlet 240 located below the leading edge forwardmost point 134 on the centerbody leading edge portion 132. As mentioned above, locating the air inlet 240 below the leading edge forwardmost point 134 on the centerbody leading edge portion 132 instead of above the leading edge forwardmost point 134 may avoid the leading edge forwardmost point 134 of the leading edge blanketing the air inlets 240 when the aircraft 100 is at high angles of attack.

Step 304 of the method 300 includes passing the air from the air inlets 240 into at least one pair of engines 202 respectively located on opposite sides of the aircraft centerline 102. Although FIGS. 1-7 illustrate an example of an aircraft 100 having a pair of engines 202, the aircraft 100 may be provided in an example having any number of engines 202 embedded within the centerbody 120. For example, the above-described example in FIG. 11 shows an aircraft 100 having two (2) pairs of engines 202 respectively located on opposite sides of the aircraft centerline 102. As mentioned above, in some examples of the aircraft 100, each air inlet 240 may be generally aligned with the corresponding engine 202 which may facilitate airflow from the air inlet 240 into the engine 202. Each engine 202 is mounted within the centerbody 120 between an upper mold line 128 and a lower mold line 130 of the centerbody 120. The upper mold line 128 and the lower mold line 130 define the aerodynamic contour of the centerbody 120 which has an airfoil-shaped cross section capable of generating aerodynamic lift, as described above.

In some examples, step 304 of passing the air into the pair of engines 202 may comprise passing the air into the pair of engines 202 each having an engine center of gravity 208 located within a distance from the aircraft center of gravity 104 of 20 percent of a distance from the nose forwardmost point of the nose 122 to the aircraft center of gravity 104. As described above, the distance between the nose 122 and the aircraft center of gravity 104 may be measured along the aircraft centerline 102. Additionally, the aircraft center of gravity 104 may be the empty weight center of gravity without fuel, cargo, or passengers in the aircraft 100.

Step 306 of the method 300 includes combusting a fuel-air mixture within the pair of engines 202. For example, each engine 202 may be a turbofan engine having a combustor (not shown) through which compressed air from the compressors 220, 222 is passed. Fuel may be injected into the compressed air and the fuel-air mixture may be ignited creating high-pressure exhaust which passes through turbines 224, 226 causing rotation of the turbines 224, 226 and the fan 212 at the front of each engine 202. In some examples, step 306 of combusting the fuel-air mixture within the pair of engines 202 may comprise combusting the fuel-air mixture within a pair of turbine engines each having a bypass ratio of from about 5-20. However, the aircraft 100 may be provided with engines 202 having a bypass ratio higher than 20 or the engines 202 may have a bypass ratio lower than 5.

Step 308 of the method 300 includes discharging an exhaust of the combustion of the fuel-air mixture from at least one pair of exhaust outlets 260 respectively fluidly coupled to the pair of engines 202. The discharge of the exhaust from the exhaust outlets 260 generates thrust for propelling the aircraft 100. In some examples, step 308 of discharging the exhaust from the pair of exhaust outlets 260 may comprise discharging the exhaust from a pair of exhaust outlets 260 defined in the upper mold line 128 (e.g., the upper side) of the aft portion 126 of the centerbody 120 as shown in the figures. However, in other examples not shown, step 308 may comprise discharging the exhaust from exhaust outlets 260 defined in the lower mold line 130.

In a still further example, step 308 may comprise discharging the exhaust from exhaust outlets 260 that are split between the upper mold line 128 and the lower mold line 130, or discharging the exhaust from exhaust outlets 260 located on the trailing edge portion of the aft portion 126 of the centerbody 120. In some examples, the method may include discharging the exhaust from exhaust duct cowlings 270 corresponding to the one or more engines 202 of the aircraft 100. In addition, the exhaust exiting each exhaust outlet 260 may pass over an exhaust duct ramp 272 that may be formed of high-temperature material and which may be incorporated into the upper mold line 128 and/or the lower mold line 130.

In some examples, step 308 of discharging the exhaust from the pair of exhaust outlets 260 may comprise discharging the exhaust from the pair of exhaust outlets 260 each located inboard of the engine centerline 204 respectively of the pair of engines 202, as shown in FIG. 4. When the aircraft 100 is viewed from a top-down direction as shown in FIG. 7, each exhaust outlet 260 may be offset in an inboard direction toward the aircraft centerline 102. As mentioned above, locating each exhaust outlet 260 near the aircraft centerline (i.e., when viewed from a top-down direction) may reduce asymmetric thrust in the event of one of the engines 202 becoming inoperable. In addition, offsetting each exhaust outlet 260 in and inboard direction may avoid direct impingement of the exhaust stream against the vertical stabilizers 170.

In still further examples, step 308 of discharging the exhaust from the pair of exhaust outlets 260 may comprise discharging the exhaust from a pair of thrust-vectoring flaps 276 mounted proximate the centerbody trailing edge portion 136 and located downstream respectively of the pair of exhaust outlets 260. The method may further include pivoting the thrust-vectoring flaps 276 (e.g., in coordination with each other) for varying a direction of the exhaust stream. For example, the method may include pivoting the thrust-vectoring flaps 276 between the neutral position 280 and the upward position 282 and/or between the neutral position 280 and the downward position 284. As mentioned above, the pivoting of the thrust-vectoring flaps 276 may enhance the pitch controllability of the aircraft 100 which may improve aircraft 100 maneuverability.

In another example, step 308 of discharging the exhaust from the pair of exhaust outlets 260 may include discharging the exhaust from a pair of thrust-vectoring exhaust nozzles 278 (FIGS. 18-21) located proximate the centerbody trailing edge portion 136. The method may include pivoting the thrust-vectoring exhaust nozzles 278 in coordination with each other for varying the direction of the exhaust stream from the aircraft 100. As mentioned above, the thrust-vectoring exhaust nozzles 278 may be vertically pivoted from the neutral position 280 to the upper position and/or from the neutral position 280 to the downward position 284 for increasing pitch controllability of the aircraft 100.

Step 308 of discharging the exhaust may include acoustically blocking, using the pair of vertical stabilizers 170 located on opposite sides of the aft portion 126, at least a portion of exhaust noise emanating from the pair of exhaust outlets 260. In this regard, the side view of the aircraft 100 in FIG. 14 shows the aft end of the exhaust duct cowlings 270 located at a position that is longitudinally aft of the stabilizer leading edges 172. The location of the exhaust duct cowlings 270 aft of the stabilizer leading edges 172 may allow the vertical stabilizers 170 to acoustically blocking at least a portion of the exhaust noise emanating from the exhaust outlets 260. For example, FIG. 15 shows an acoustic emission vector oriented in a laterally outboard direction from the outlet geometric center 266 of each exhaust outlet 260. The acoustic emission vector 274 represents a portion of the exhaust noise that may emanate from the exhaust outlet 260. The vertical stabilizers 170 may deflect the acoustic emission vectors 274 into an upward direction and away from the ground, which may have the effect of reducing the magnitude of airport community noise otherwise generated by the aircraft 100. In some examples, the aircraft 100 may include a strake 174 (FIGS. 13-14) extending forwardly from each of the vertical stabilizers 170. Each strake 174 may increase the blocking or shielding of exhaust noise emanating from the exhaust outlets 260.

Referring now to FIGS. 23-30, shown is an example of an aircraft 100 in a flying wing configuration 112 having embedded engines 202. The aircraft 100 includes a pair of wings 140 integral with each other. In some examples, the pair of wings 140 may be structurally joined to each other. The aircraft 100 may lack a distinct structural joint coupling the pair of wings 140. Regardless of whether or not the aircraft 100 includes a structural joint coupling the wings 140, the dividing line between the pair of wings 140 may be described as the wing-wing juncture 150. Each one of the wings 140 has an upper mold line 128, a lower mold line 130, a wing leading edge portion 142 and a wing trailing edge portion 144. The wing leading edge portions 142 of the pair of wings 140 may converge at the nose 122 of the aircraft 100.

Figure 23:
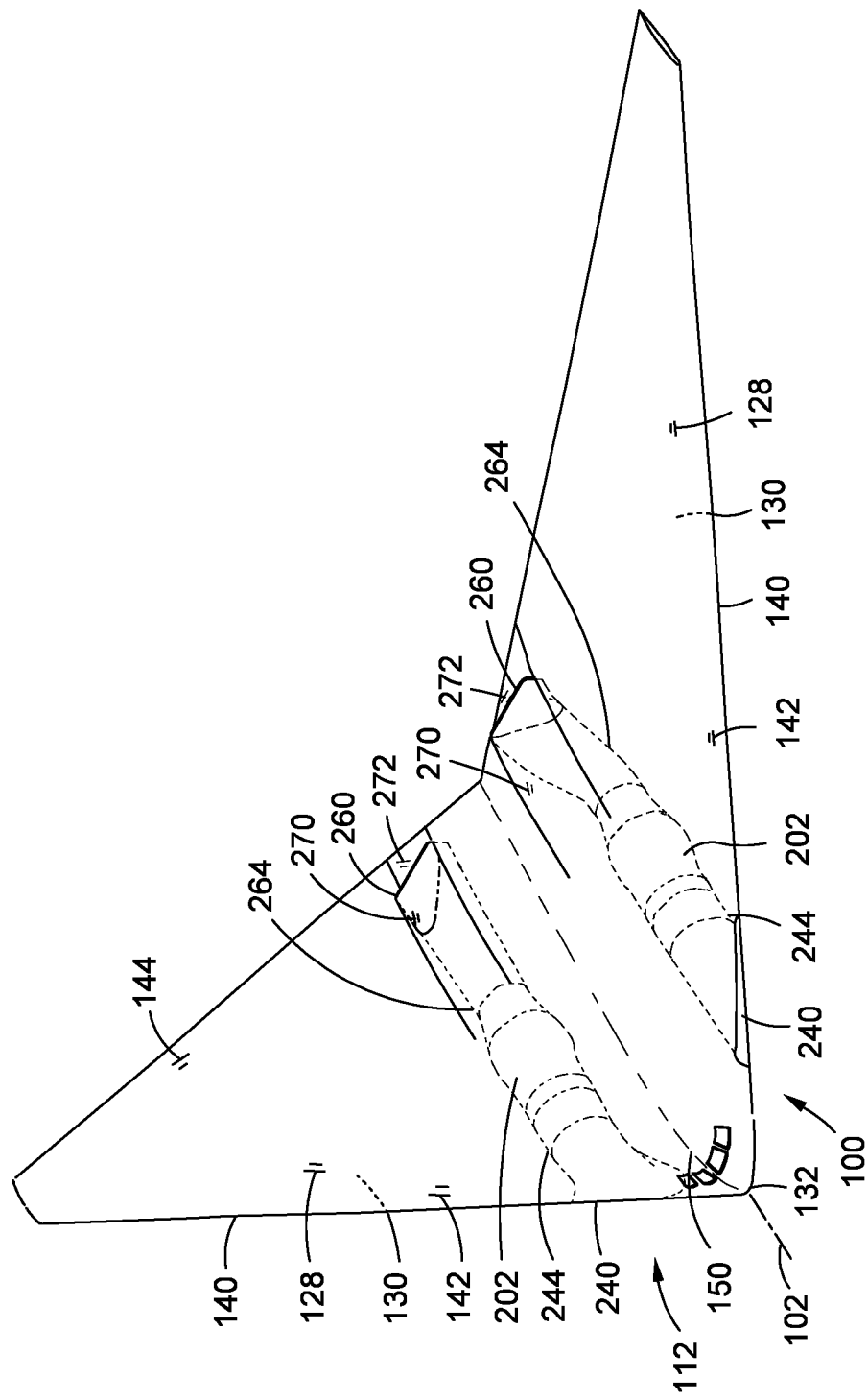
FIG. 23 is a top-down aft perspective view of an example of an aircraft having a flying wing configuration and illustrating a pair of wings integral with each other and within which a pair of engines are embedded.

FIG. 23 is a top-down view of the aircraft 100 showing the pair of wings 140 integral with each other and within which at least one pair of engines 202 are embedded. The pair of wings 140 are non-separated by any intervening structure such as a fuselage (not shown), a centerbody, and/or other structures. In some examples, the pair of wings 140 may be joined to each other at the wing roots (not shown) of the pair of wings 140. Each one of the wings 140 may have a generally constant airfoil shape from the wing root to the wing tip. The constant airfoil shape of each wing 140 may taper in size from the wing root to the wing tip.

In some examples not shown, a flying wing configuration 112 may include a canopy or a cockpit that may be mounted at one or more locations along the wing-wing juncture 150. Alternatively or additionally, a flying wing configuration 112 may include an empennage (not shown) extending aftwardly from the wing trailing edge portions 144 of the pair of wings 140. For example, one or more tail booms (not shown) may extend aftwardly from the wings 140. An empennage (not shown) may support one or more tail surfaces such as a horizontal tail and/or one or more vertical tails which may be vertically oriented or non-vertically oriented (e.g., canted). Alternatively or additionally, the flying wing configuration 112 may include one or more vertical tails (not shown) such as vertical fins mounted on the wings 140.

Any one of the aircraft configurations disclosed herein may include any one or more of a variety of other flight control surfaces (not shown) for directional control of the aircraft 100. For example, any one of the aircraft configurations disclosed herein may include elevons, ailerons, flaps, spoilers, speed brakes, and/or one or more high-lift devices on the wing leading edge portion 142, such as leading edge slats, Krueger flaps, or other high-lift devices. Furthermore, any one of the aircraft configurations disclosed herein may include winglets (single winglets or split winglets—not shown) on the wing tips. In addition, the above-described size, shape, configuration, and/or arrangement of any one of the components (e.g., air inlets 240, inlet ducts 244, engines 202, exhaust ducts 264, exhaust outlets 260, etc.) of the blended-wing-body configuration 110 may be implemented on the flying wing configuration 112.

In FIGS. 23-30, the aircraft 100 has at least one pair of engines 202 located on opposite sides of the aircraft centerline 102 and mounted respectively within the pair of wings 140 between the upper mold line 128 and the lower mold line 130. Each engine 202 is configured as a turbofan engine which has at least one fan 212 and a core 216 as shown in FIG. 29 and described in greater detail below. As described in relation to the blended-wing-body configuration 110 (FIGS. 1-21), the engines 202 of the flying wing configuration 112 may not protrude beyond the upper mold line 128 or beyond the lower mold line 130 of the wings 140.

Figure 24:
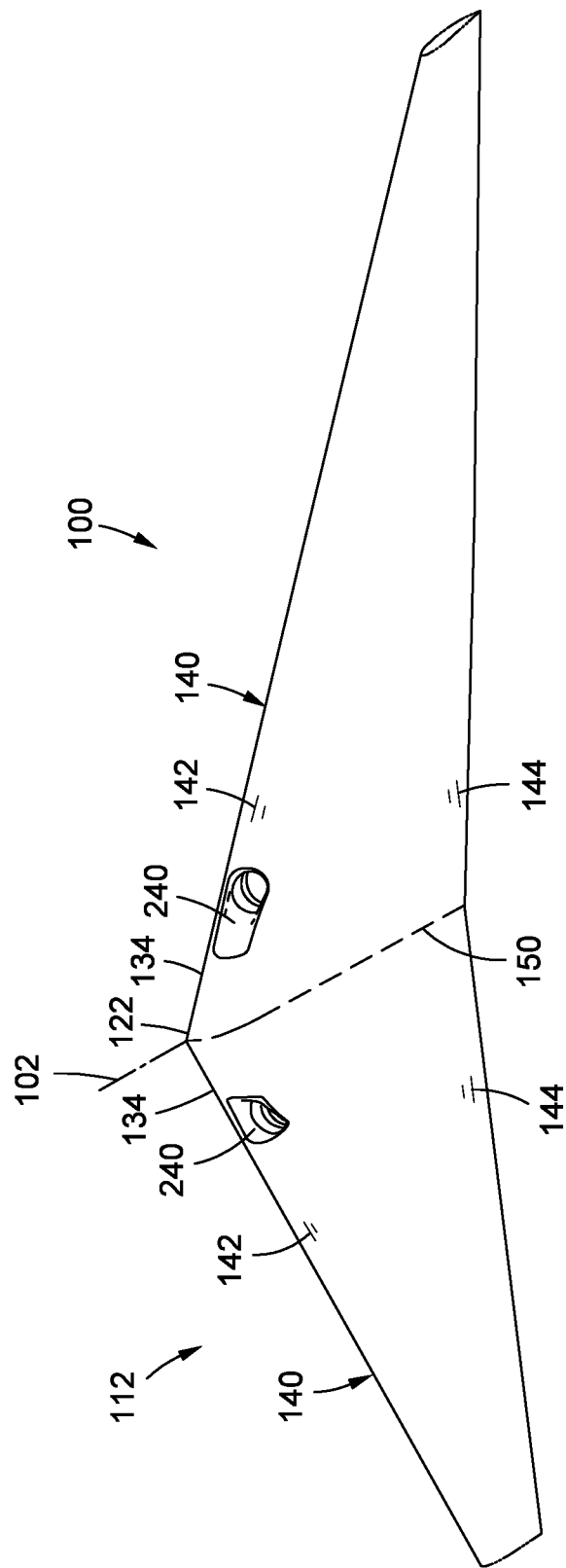
FIG. 24 is a bottom-up aft perspective view of the aircraft of FIG. 23 showing a pair of air inlets located along the wing leading edge portion respectively of the pair of wings.

Referring to FIGS. 23-24, the flying wing configuration 112 aircraft 100 includes a pair of air inlets 240 located respectively along the wing leading edge portions 142. The pair of air inlets 240 are respectively fluidly coupled to the pair of engines 202. For example, a pair of inlet ducts 244 may respectively fluidly couple the pair of air inlets 240 to the pair of engines 202 in a manner similar to the above-described inlet ducts 244 of the blended-wing-body configuration 110 (FIGS. 1-21). In any of the aircraft 100 examples disclosed herein, the air inlets 240 may not protrude beyond the upper mold line 128 or beyond the lower mold line 130 of the wing leading edge portion 142. In this regard, the air inlets 240 may not protrude beyond the airfoil-shaped cross-section of the wing 140. The air inlets 240 of the flying wing configuration 112 (e.g., FIGS. 23-30) may be configured and positioned on the wing leading edge portions 142 of the wings 140 in a manner similar to the configuration and positioning of the air inlets 240 on the centerbody leading edge portions 132 of the blended-wing-body configuration 110 (e.g., FIGS. 1-21).

As shown in FIGS. 24-25, each air inlet 240 may be located at least partially below a leading edge forwardmost point 134 of the wing leading edge portion 142 in a manner similar to the above-described positioning of the air inlets 240 along the centerbody leading edge portions 132 of the blended-wing-body configuration 110. For example, in FIGS. 24-25, an entirety of each air inlet 240 may be located below the leading edge forwardmost point 134 of the wing leading edge portion 142 which may avoid the blanketing of airflow into the air inlets 240 that may otherwise occur at high angles of attack for air inlets 240 located above the leading edge forwardmost point 134 of the wing leading edge portions 142. In some examples, each air inlet 240 may be located on the corresponding wing leading edge portion 142 such that the inlet geometric center 246 (FIG. 25) is offset by an air inlet offset 248 (FIG. 25) distance from the engine centerline 204. For example, the inlet geometric center 246 of each air inlet 240 may be located inboard of and below the engine centerline 204 similar to the above-described arrangement shown in FIG. 3.

Referring to FIGS. 23 and 26, the aircraft 100 also includes a pair of exhaust outlets 260 respectively fluidly coupled to the pair of engines 202. A pair of exhaust ducts 264 (FIG. 23) may respectively fluidly couple the pair of exhaust outlets 260 to the pair of engines 202. As shown in FIG. 23, the pair of exhaust outlets 260 may be defined in the upper mold line 128 respectively of the pair of wings 140 in a manner similar to the above-described location of the exhaust outlets 260 in the upper mold line 128 of the centerbody 120 of the blended-wing-body configuration 110. Similar to the above-described arrangement of the exhaust outlets 260 in the blended-wing-body configuration 110, each one of the exhaust outlets 260 may be defined in part by an exhaust duct cowling 270 that may protrude above the upper mold line 128 of a respective wing 140. In addition, each exhaust outlet 260 may be defined in part by an exhaust duct ramp 272 (FIG. 23) that may extend afterwardly from the exhaust outlet 260. The exhaust duct ramp 272 may be configured as a depression in the upper mold line 128 of the wing 140. The aft end of each exhaust duct ramp 272 may blend into the upper mold line 128 of the wing 140. Locating the exhaust outlets 260 in the upper mold line 128 of the wings 140 may advantageously reduce airport noise that would otherwise occur if the exhaust outlets 260 were defined in the lower mold line 130 of the wings 140.

Figure 27:
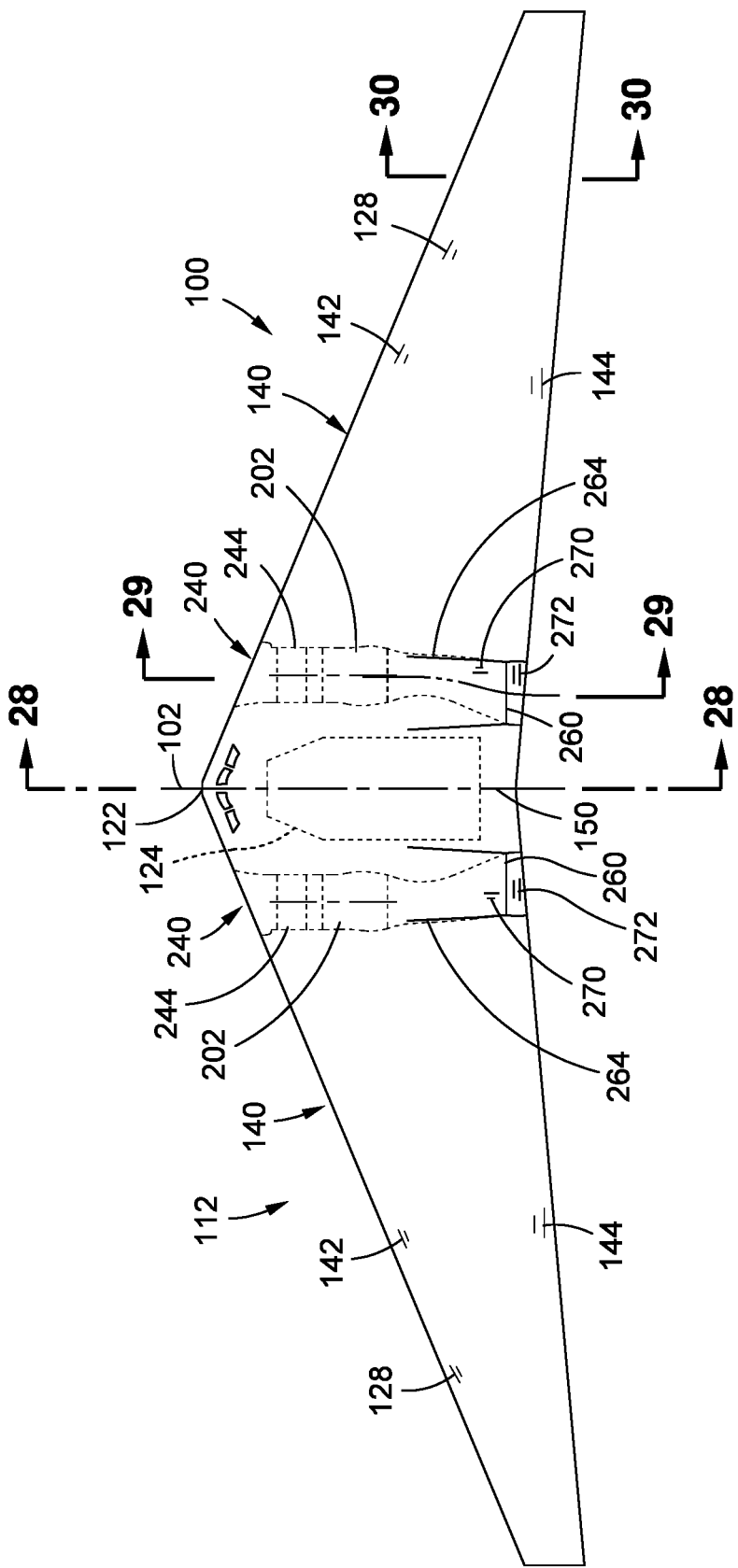
FIG. 27 is a top view of the aircraft of FIGS. 23-24.

Referring to FIGS. 26-27, the outlet geometric center 266 (FIG. 26) of each exhaust outlet 260 may be offset by an exhaust outlet offset 268 distance. In the example shown, the outlet geometric center 266 may be located inboard of the engine centerline 204 of the corresponding engine 202 in an arrangement similar to the above-described positioning of the exhaust outlets 260 for the blended-wing-body configuration 110. FIG. 27 is a top view of the aircraft 100 showing a slight S-shaped configuration of each exhaust duct 264 to allow the exhaust from each engine 202 to smoothly flow to the exhaust outlet 260. As mentioned above, locating each exhaust outlet 260 inboard of the corresponding engine centerline 204 may advantageously reduce asymmetric thrust as may occur in the event of one of the engines 202 becoming inoperable. Also shown in FIG. 27 is an example of a payload bay 124 that may be included in the flying wing configuration 112.

In any one of the aircraft 100 configurations disclosed herein, the exhaust outlets 260 are not limited to being defined in the upper mold line 128, but may alternatively be defined in the lower mold line 130 of the wings 140 of the flying wing configuration 112, or in the lower mold line 130 of the centerbody of the blended-wing-body configuration 110. In still further examples not shown, the pair of exhaust outlets 260 may be defined in a combination of both the upper mold line 128 and the lower mold line 130. For example, the exhaust outlets 260 may be split between protruding above the upper mold line 128 and protruding below the lower mold line 130 of the wings 140. In a still further example not shown, the aftmost edge of each exhaust outlet 260 may terminate at a wing trailing edge portion 144.

Although not shown in FIGS. 23-27, the flying wing configuration 112 may include thrust-vectoring flaps 276 similar to the above-described arrangement shown in FIGS. 16-17. The thrust-vectoring flaps 276 may be mounted proximate the wing trailing edge portion 144 respectively of the pair of wings 140 and located downstream respectively of the pair of exhaust outlets 260. For example, each thrust-vectoring flap 276 may be located downstream of the exhaust duct ramps 272 proximate the wing trailing edge portion 144 respectively of the pair of wings 140. Each one of the thrust-vectoring flaps 276 is pivotable (e.g., up and/or down) in a manner as described above for varying the direction of the exhaust stream for increasing the pitch controllability of the aircraft 100. Alternatively, the pair of exhaust outlets 260 may comprise a pair of thrust-vectoring exhaust nozzles 278 (not shown) located proximate the wing trailing edge portion 144 respectively of the pair of wings 140, and which may be configured similar to the above-described arrangement of thrust-vectoring exhaust nozzles 278 for the blended-wing-body configuration 110 for increasing pitch control of the aircraft 100.

Referring to FIGS. 28-30, shown is a sectional view taken at different locations along one of the wings 140 of the flying wing configuration 112 and illustrating the airfoil-shaped cross-section at each location. As mentioned above, each one of the wings 140 has an airfoil-shaped cross-section that may be substantially the same shape from the wing root (e.g., at the wing-wing juncture 150—FIG. 28) to the wing tip (e.g., proximate FIG. 30), although the airfoil-shaped cross-section may taper in size from the wing root (e.g., at the wing-wing juncture 150) to the wing tip.

FIG. 29 is a sectional view of the aircraft 100 showing the turbofan engine mounted within the wing 140 between the upper mold line 128 and the lower mold line 130 of the wing 140. Also shown is the inlet duct 244 fluidly coupling the air inlet 240 to the engine 202, and the exhaust duct 264 fluidly coupling the engine 202 to the exhaust outlet 260. As mentioned above, each turbofan engine has at least one fan 212 and a core 216. Although shown having a single large-diameter fan, the turbofan engine may include two or more relatively small-diameter fans arranged in stages (not shown). As described above with regard to the blended-wing-body configuration 110 shown in FIG. 8, the core 216 of the turbofan engine includes one or more turbines (e.g., 224, 226) and one or more compressors (e.g., 220, 222) which draw the core stream 218 through the core 216. Rotation of the turbines 224, 226 and compressors 220, 222 drives the fan 212 which forces a bypass stream 214 of air between the engine duct 210 and the core 216. The combination of the bypass stream 214 and the exhaust of the core stream 218 provides the thrust for propelling the aircraft 100. In some examples of the present disclosure, each one of the engines 202 may have a bypass ratio of from 5 to 20.

However, the engines 202 may have a bypass ratio of less than 5 or a bypass ratio of greater than 20. In this regard, a turbofan engine may be distinguished from a turbojet engine which lacks a fan and therefore has no bypass stream. A turbofan engine may generate less noise and/or may be more fuel efficient than a turbojet engine of approximately equivalent size.

Similar to the above-described engine placement for the blended-wing-body configuration 110, the engines 202 in the flying wing configuration 112 may have an engine center of gravity (e.g., FIG. 9) that is longitudinally positioned (i.e., along a direction parallel to the aircraft centerline 102—FIG. 27) within a distance from the aircraft center of gravity (e.g., FIG. 9) of 20 percent (i.e., between 80-120 percent) of a horizontal distance from nose forwardmost point of the nose 122 (at the aircraft centerline 102—FIG. 27) to the aircraft center of gravity. However, the flying wing configuration 112 advantageously allows for positioning the engine center of gravity at any location relative to the aircraft center of gravity.

Although not shown, the flying wing configuration 112 may include more than one pair of engines 202. For example, the flying wing configuration 112 may include at least two (2) pairs of engines 202 on opposite sides of the aircraft centerline 102 similar to the above-described arrangement shown in FIG. 11. The increased redundancy provided by two (2) pairs of engines 202 on each side of the aircraft 100 may increase the reliability of the propulsion system 200 for the flying wing configuration 112. In any one of the examples disclosed herein, the engines 202 may be longitudinally staggered or offset from each other. For example, the flying wing configuration 112 may include a single pair of engines 202 that are longitudinally offset from one another similar to the above-described arrangement shown in FIG. 12. Longitudinally offsetting the engines 202 may prevent an uncontained engine failure (e.g., due to rotor blade departure from a compressor or a turbine) of one engine 202 from affecting the operability of the adjacent engine(s) 202, as mentioned above.

Figure 31:
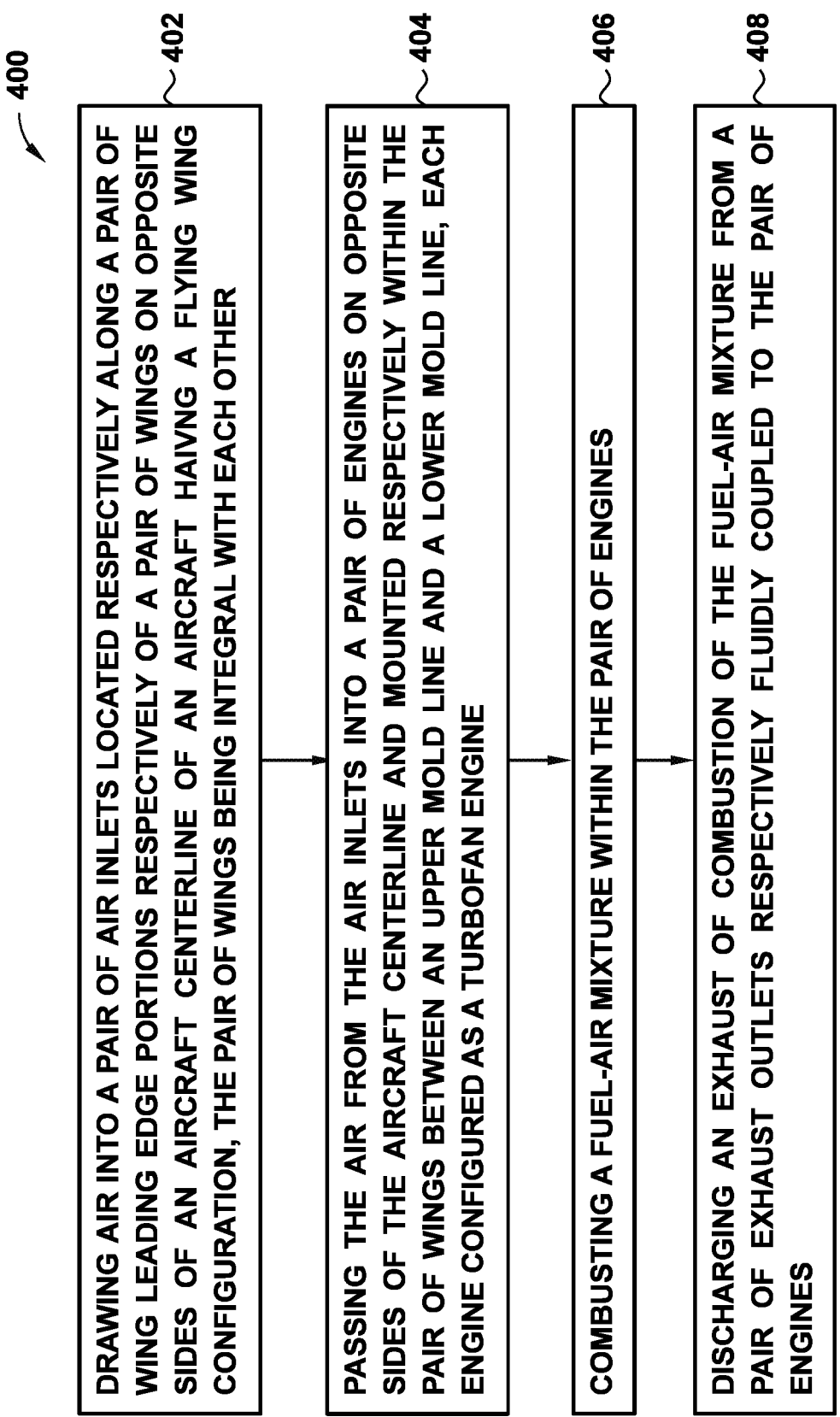
FIG. 31 is a flowchart of operations included in a method of operating an aircraft having a flying wing configuration.

FIG. 31 is a flowchart of operations included in a method 400 of operating an aircraft 100 having a flying wing configuration 112, an example of which is shown in FIGS. 23-30. Step 402 of the method includes drawing air into a pair of air inlets 240 located respectively along a pair of wing leading edge portions 142 respectively of a pair of wings 140 on opposite sides of an aircraft centerline 102 of the aircraft 100. As described above, the pair of wings 140 are integral with each other. The step 402 of drawing the air into the pair of air inlets 240 may include drawing the air into the pair of air inlets 240 located at least partially below a leading edge forwardmost point 134 respectively of the pair of wing leading edge portions 142 as shown in FIG. 24 and described above.

Step 404 of the method 400 includes passing the air from the air inlets 240 into a pair of engines 202 located on opposite sides of the aircraft centerline 102. As described above, the pair of engines 202 are mounted respectively within the pair of wings 140 between an upper mold line 128 and a lower mold line 130. Each engine 202 is configured as a turbofan engine which, as shown in FIG. 29 and described above, includes a fan 212 and a core 216 respectively generating a bypass stream 214 and a core stream 218 for generating engine thrust. Step 404 of passing the air into the pair of engines 202 further may include passing the air into the pair of engines 202 each having an engine center of gravity 208 located within a distance from the aircraft center of gravity 104 of 20 percent of a distance from a nose forwardmost point to the aircraft center of gravity 104. As described above, the distance from the nose 122 to the engine center of gravity 208 is measured along the aircraft centerline 102. As also mentioned above, the engine center of gravity 208 may be located at any distance from the aircraft center of gravity 104.

Step 406 of the method 400 includes combusting a fuel-air mixture within the pair of engines 202. As mentioned above, the engines 202 are configured as turbofan engines each generating a bypass stream 214 and a core stream 218. Step 406 of combusting the fuel-air mixture within the pair of engines 202 may comprise combusting the fuel-air mixture within a pair of turbofan engines each having a bypass ratio of from about 5-20. However, as mentioned above, the engines 202 may be provided in a bypass ratio lower than 5 or higher than 20.

Step 408 of the method 400 includes discharging an exhaust of combustion of the fuel-air mixture from a pair of exhaust outlets 260 respectively fluidly coupled to the pair of engines 202. In some examples, step 408 of discharging the exhaust from the pair of exhaust outlets 260 may comprise discharging the exhaust from the pair of exhaust outlets 260 defined in the upper mold line 128 respectively of the pair of wings 140 as shown in FIGS. 23, 26 and 29. However, in an alternative examples not shown, the method may include discharging the exhaust from exhaust outlets 260 defined in the lower mold line 130 of the pair of wings 140, or the exhaust outlets 260 may be defined in a combination of the upper mold line 128 and the lower mold line 130, as mentioned above. In some examples, step 408 of discharging the exhaust from the pair of exhaust outlets 260 may comprise discharging the exhaust from the pair of exhaust outlets 260 each located inboard of an engine centerline 204 respectively of the pair of engines 202 (e.g., FIG. 27) which may reduce asymmetric thrust that may occur if one of the engines 202 becomes inoperable.

In still further examples, step 408 of discharging the exhaust from the pair of exhaust outlets 260 may include deflecting the exhaust using a pair of thrust-vectoring flaps 276 (not shown) mounted proximate the wing trailing edge portion 144 respectively of the pair of wings 140, and pivoting the thrust-vectoring flaps 276 (e.g., up and/or down) for varying the direction of the exhaust stream from the engines 202. In an example similar to the blended-wing-body configuration 110 aircraft 100 of FIG. 16, thrust-vectoring flaps 276 on a flying wing configuration 112 (e.g., FIG. 23-30) may be located downstream of the exhaust outlets 260. As an alternative to thrust-vectoring flaps 276, step 408 of discharging the exhaust from the pair of exhaust outlets 260 may include discharging the exhaust from a pair of thrust-vectoring exhaust nozzles 278 (not shown) located proximate the wing trailing edge portion 144 respectively of the pair of wings 140, and pivoting the thrust-vectoring exhaust nozzles 278 (e.g., vertically up and/or down) for varying the direction of the exhaust stream. As described above, the thrust-vectoring flaps 276 and/or thrust-vectoring exhaust nozzles 278 may enhance the pitch controllability of the aircraft 100.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. An aircraft having a blended-wing-body configuration, comprising:
 a centerbody having an airfoil-shaped cross section, an aircraft centerline, an aft portion, an upper mold line, a lower mold line, and a pair of centerbody leading edge portions respectively on opposite sides of the aircraft centerline;
 a pair of wings integral with the centerbody;
 at least one pair of engines located on opposite sides of the aircraft centerline and mounted within the centerbody between the upper mold line and the lower mold line, each engine has an engine centerline;
 a pair of air inlets located respectively along the pair of centerbody leading edge portions and respectively fluidly coupled to the pair of engines;
 a pair of exhaust outlets located in the aft portion of the centerbody and respectively fluidly coupled to the pair of engines, each exhaust outlet has an outlet geometric center located inboard of the engine centerline; and
 a pair of exhaust ducts respectively fluidly coupling the pair of exhaust outlets to the pair of engines, each exhaust duct has a slight S-shaped configuration when the aircraft is viewed from a top-down direction, the S-shaped configuration allowing exhaust from each engine to smoothly flow to the exhaust outlet.

2. The aircraft of claim 1 wherein:
 the pair of exhaust outlets are defined in the upper mold line of the aft portion of the centerbody.

3. The aircraft of claim 2 wherein:
 each exhaust outlet has an exhaust duct cowling protruding above the upper mold line of the centerbody.

4. The aircraft of claim 1, wherein:
 the centerbody has an airfoil thickness-to-chord ratio of at least 10 percent;
 each wing has an airfoil thickness-to-chord ratio of less than 10 percent; and
 the aircraft has a wing-centerbody juncture at a location where the airfoil thickness-to-chord ratio changes from less than 10 percent to at least 10 percent.

5. The aircraft of claim 1, further including:
 a transverse axis oriented perpendicular to the aircraft centerline;
 the centerbody having a centerbody trailing edge portion having a centerbody trailing edge sweep angle defined relative to the transverse axis;
 each one of the wings having a wing trailing edge portion having a wing trailing edge sweep angle defined relative to the transverse axis; and
 the wing trailing edge sweep angle being different than the centerbody trailing edge sweep angle on each side of the aircraft such that an intersection of the wing trailing edge portion with the centerbody trailing edge portion defines a trailing edge planform break.

6. The aircraft of claim 1 wherein:
 each exhaust outlet has a rectangular shape with rounded corners.

7. A method of operating an aircraft having a blended-wing-body configuration, comprising:
 drawing air into a pair of air inlets located respectively along a pair of centerbody leading edge portions on opposite sides of an aircraft centerline of a centerbody of the aircraft, the centerbody having an airfoil-shaped cross section, the aircraft including a pair of wings integral with the centerbody;
 passing the air from the air inlets into a pair of engines on opposite sides of the aircraft centerline and mounted within the centerbody between an upper mold line and a lower mold line of the centerbody;
 combusting a fuel-air mixture within the pair of engines; and
 discharging an exhaust of combustion of the fuel-air mixture from a pair of exhaust outlets respectively fluidly coupled to the pair of engines, the pair of exhaust outlets each located inboard of an engine centerline respectively of the pair of engines, the exhaust passing through a pair of exhaust ducts respectively fluidly coupling the pair of exhaust outlets to the pair of engines, each exhaust duct has a slight S-shaped configuration when the aircraft is viewed from a top-down direction, the S-shaped configuration allowing the exhaust from each engine to smoothly flow to the exhaust outlet.

8. The method of claim 7, wherein combusting the fuel-air mixture within the pair of engines comprises:
 combusting the fuel-air mixture within a pair of turbine engines each having a bypass ratio of from about 5-20.

9. The method of claim 7, further comprising:
 acoustically blocking, using a pair of vertical stabilizers located on opposite sides of an aft portion of the centerbody, at least a portion of exhaust noise emanating from the pair of exhaust outlets.

10. The method of claim 7 wherein discharging the exhaust from the pair of exhaust outlets further comprises:
 discharging the exhaust from the pair of exhaust outlets, each exhaust outlet having an exhaust duct cowling protruding above the upper mold line of the centerbody.

11. An aircraft having a flying wing configuration, comprising:
 a pair of wings integral with each other and collectively defining an aircraft centerline, each one of the wings having an upper mold line, a lower mold line, a wing leading edge portion and a wing trailing edge portion;
 at least one pair of engines located on opposite sides of the aircraft centerline and mounted respectively within the pair of wings between the upper mold line and the lower mold line, each engine has an engine centerline;
 a pair of air inlets located respectively along the wing leading edge portions and respectively fluidly coupled to the pair of engines;
 a pair of exhaust outlets respectively fluidly coupled to the pair of engines, each exhaust outlet has an outlet geometric center located inboard of the engine centerline; and
 a pair of exhaust ducts respectively fluidly coupling the pair of exhaust outlets to the pair of engines, each exhaust duct has a slight S-shaped configuration when the aircraft is viewed from a top-down direction, the S-shaped configuration allowing exhaust from each engine to smoothly flow to the exhaust outlet.

12. The aircraft of claim 11, wherein:
 each one of the engines of the pair has a bypass ratio of from 5 to 20.

13. The aircraft of claim 11, wherein:
 the pair of exhaust outlets are defined in the upper mold line respectively of the pair of wings.

14. The aircraft of claim 13 wherein:
 each exhaust outlet has an exhaust duct cowling protruding above the upper mold line of one of the wings.

15. The aircraft of claim 11, wherein:
 the aircraft has a nose and an aircraft center of gravity;
 each one of the engines has an engine center of gravity;
 the engine center of gravity of each one of the engines is located within a distance, from the aircraft center of gravity, of 20 percent of a distance from of a foremost point of the nose to the aircraft center of gravity; and the distance being measured along the aircraft centerline.

16. A method of operating an aircraft having a flying wing configuration, comprising:

drawing air into a pair of air inlets located respectively along a pair of wing leading edge portions respectively of a pair of wings on opposite sides of an aircraft centerline of the aircraft, the pair of wings being integral with each other;

passing the air from the air inlets into a pair of engines on opposite sides of the aircraft centerline and mounted respectively within the pair of wings between an upper mold line and a lower mold line, each one of the pair of engines configured as a turbofan engine;

combusting a fuel-air mixture within the pair of engines; and discharging an exhaust of combustion of the fuel-air mixture from a pair of exhaust outlets respectively fluidly coupled to the pair of engines, the pair of exhaust outlets each located inboard of an engine centerline respectively of the pair of engines, the exhaust passing through a pair of exhaust ducts respectively fluidly coupling the pair of exhaust outlets to the pair of engines, each exhaust duct has a slight S-shaped configuration when the aircraft is viewed from a top-down direction, the S-shaped configuration allowing the exhaust from each engine to smoothly flow to the exhaust outlet.

17. The method of claim 16, wherein discharging the exhaust from the pair of exhaust outlets comprises:

discharging the exhaust from the pair of exhaust outlets defined in the upper mold line respectively of the pair of wings.

18. The method of claim 17 wherein discharging the exhaust from the pair of exhaust outlets further comprises:

discharging the exhaust from the pair of exhaust outlets, each exhaust outlet having an exhaust duct cowling protruding above the upper mold line of one of the wings.

19. The method of claim 16, wherein the step of combusting the fuel-air mixture within the pair of engines comprises:

combusting the fuel-air mixture within a pair of turbine engines each having a bypass ratio of from about 5-20.

20. An aircraft having a blended-wing-body configuration, comprising:

a centerbody having an airfoil-shaped cross section, an aircraft centerline, an aft portion, an upper mold line, a lower mold line, and a pair of centerbody leading edge portions respectively on opposite sides of the aircraft centerline;

a pair of wings integral with the centerbody;

at least one pair of engines located on opposite sides of the aircraft centerline and mounted within the centerbody between the upper mold line and the lower mold line, each engine has an engine centerline;

a pair of air inlets located respectively entirely above the pair of centerbody leading edge portions and respectively fluidly coupled to the pair of engines;

a pair of exhaust outlets located in the aft portion of the centerbody and respectively fluidly coupled to the pair of engines, each exhaust outlet has an outlet geometric center located inboard of the engine centerline; and a pair of exhaust ducts respectively fluidly coupling the pair of exhaust outlets to the pair of engines, each exhaust duct has a slight S-shaped configuration when the aircraft is viewed from a top-down direction, the S-shaped configuration allowing exhaust from each engine to smoothly flow to the exhaust outlet.

* * * * *